US008051000B2

(12) United States Patent
Kurczek et al.

(10) Patent No.: US 8,051,000 B2
(45) Date of Patent: Nov. 1, 2011

(54) TRADE STRATEGY MONITOR PLATFORM

(75) Inventors: Dion Keith Kurczek, Chicago, IL (US); James Mazzu, Boston, MA (US); George Rozanitis, Boston, MA (US); Franklin Harold Gold, Needham, MA (US); Chad Pangborn, Boston, MA (US); Alonzo Kent Thacker, Draper, UT (US); Max Matthew George, Syracuse, UT (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 11/936,076

(22) Filed: Nov. 6, 2007

(65) Prior Publication Data
US 2009/0119226 A1    May 7, 2009

(51) Int. Cl.
*G06Q 40/00*    (2006.01)
(52) U.S. Cl. ........................................... 705/37
(58) Field of Classification Search ............... 705/37
See application file for complete search history.

(56) References Cited

U.S. PATENT DOCUMENTS

| | | | |
|---|---|---|---|
| 5,987,432 A | | 11/1999 | Zusman et al. |
| 6,484,151 B1* | | 11/2002 | O'Shaughnessy .......... 705/36 R |
| 6,529,217 B1 | | 3/2003 | Maguire, III et al. |
| 7,036,089 B2 | | 4/2006 | Bauer |
| 7,346,848 B1 | | 3/2008 | Ruthfield et al. |
| 7,379,909 B1 | | 5/2008 | Cruz et al. |
| 2002/0111891 A1* | | 8/2002 | Hoffman et al. ................. 705/36 |
| 2004/0236669 A1 | | 11/2004 | Horst et al. |
| 2004/0254872 A1 | | 12/2004 | Grzebeta et al. |
| 2006/0259394 A1 | | 11/2006 | Cushing et al. ................. 705/37 |
| 2007/0124230 A1 | | 5/2007 | Sofianos ........................ 705/37 |
| 2007/0156570 A1 | | 7/2007 | Singer et al. ..................... 705/37 |
| 2007/0156580 A1 | | 7/2007 | Imrey et al. ..................... 705/39 |
| 2007/0208654 A1 | | 9/2007 | Stearns ........................... 705/37 |
| 2009/0063359 A1 | | 3/2009 | Connors |
| 2009/0119195 A1* | | 5/2009 | Kurczek et al. ................. 705/35 |

OTHER PUBLICATIONS

International Search Report from the International Searching Authority, mailed Mar. 30, 2009, 2 pages.
Bahadur, Nigel, "Trade Navigator Platinum V.3.01," Futures, Feb. 2007, vol. 36, Issue 3, pp. 56-57.
Carey, Theresa W., "New Brain Boosters," Barron's, Oct. 24, 2005, vol. 85, Issue 43, p. 45.
Multicharts software product web site, http://web.archive.org/web/20070305163503/www.tssupport.com/products/multicharts/testing, (retrieved on Aug. 19, 2009) (2 pages).
Trading Platform website, http://www.tradestation.com/platform/overview.shtm, (retrieved on Sep. 10, 2009) (1 page). Office Action from U.S. Appl. No. 11/936,071 mailed Oct. 1, 2009 (15 pages).
Office Action from U.S. Appl. No. 11/936,071 mailed Apr. 12, 2010 (17 pages).
Office Action from U.S. Appl. No. 11/936,071 mailed Jun. 9, 2011 (12 pages).

* cited by examiner

*Primary Examiner* — Lindsay M. Maguire
(74) *Attorney, Agent, or Firm* — Proskauer Rose LLP

(57) ABSTRACT

Described are methods and systems, including computer program products, for trade strategy monitoring. A back-end server can receive a first input from a first client device indicative of a first trade strategy and a first test parameter. The back-end server can obtain historical data associated with the first trade strategy, execute the first trade strategy on the historical data in accordance with the first test parameter, and transmit the results in a normalized format to the first client device. The back-end server can receive a second input from a second client device indicative of a second trade strategy and a second test parameter. The back-end server can obtain historical data associated with the second trade strategy, execute the second trade strategy on the historical data in accordance with the second test parameter, and transmits the results in a normalized format to the second client device.

18 Claims, 19 Drawing Sheets

TRADE STRATEGY MONITOR PLATFORM

FIELD OF THE INVENTION

The present invention relates generally to a financial services system that enables users to develop, test and execute trading strategies.

BACKGROUND

As the Internet has become more widespread, the amount of information it can make readily available to the public has given rise to new products in the financial services industry. Whereas investors previously relied upon expert analysis and recommendations for specific stock or fund performances and trends in the market, the ability to access and process virtually unlimited amounts of information has given traders a new level of control over their investing decisions. By analyzing information themselves, traders can detect trends and patterns that indicate favorable trade opportunities.

Nevertheless, traders need environments in which to develop and test their investment strategies before expending capital on actual purchases. Backtesting is the practice of simulating a trade strategy by running it upon historical data, thus enabling traders to view how their strategy would have fared over a defined timeframe. Fidelity Wealth Lab Pro is at the forefront in providing backtesting capability. It enables users to test strategies on entire portfolios of stocks and it places almost exhaustive levels of market data at the users' disposal. Users have access to at least ten years of historical end-of-day data, two years of intra-day price data, six years of fundamental data, and ten years of economic indicators. If desired, users may access streaming, real-time data as part of their chosen backtesting strategy. Wealth Lab Pro is a thick client application that loads and executes on the traders computer.

Traders gain valuable insight from obtaining and analyzing the results of backtesting. Backtesting enables them to optimize their strategies by comparing the effectiveness of alternatives and evaluating refinements, as well as the results compared to a buy-and-hold strategy. It also helps them test theories of which combinations of economic, fundamental, or technical indicators are best for selecting outperforming stocks. Results also help create risk management policies such as stop-loss guidelines and value-at-risk limits, or profit optimization predictions based on support, resistance, and breakout levels. It also permits traders to set margin and money management rules such as would be used in real-time financial, trading situations.

Wealth Lab Pro also provides numerous options and avenues for developing investment strategies. Users may access trade strategies developed by other users, also "as is" or as building blocks. Alternatively, traders may develop trade strategies from the ground up. Once a strategy is established, the criteria used for that strategy can be changed by either reprogramming the strategy or reconfiguring the strategy with a rules wizard.

SUMMARY OF THE INVENTION

In one aspect, there is a method of monitoring a plurality of trade strategies in a single window. The method can have the steps of installing a plurality of trade strategies in the single window of a strategy monitor and activating the trade strategies to execute automatically and independently of one another. The plurality of trade strategies can include a first trade strategy with a value of a parameter that is different from the value of a parameter of a second trade strategy.

In another aspect, there is a computer program product embodied in an information carrier. The instructions of the computer program product can cause a data processing apparatus to install a plurality of trade strategies in the single window of a strategy monitor and activate the plurality of trade strategies to execute automatically and independently from one another. The plurality of trade strategies can include a first trade strategy with a value of a parameter that is different from the value of a parameter of a second trade strategy.

In another aspect, there is a system for developing and testing financial strategies that has a strategy monitor. A plurality of trade strategies can be installed in the single window of a strategy monitor. The plurality of trade strategies can include a first trade strategy with a value of a parameter that is different from the value of a parameter of a second trade strategy. The strategy monitor can activate the plurality of trade strategies so they execute automatically and independently of one another.

In another aspect, there is a system for developing and testing financial strategies with a means for installing a plurality of trade strategy in a single window and for activating the plurality of trade strategies to execute automatically and independently of one another. The plurality of trade strategies can include a first trade strategy with a value of a parameter that is different from the value of a parameter of a second trade strategy.

In other examples, any of the aspects above can include one or more of the following features. The parameter can be an account identifier, a set of one or more symbols, a data scale, a data rate, a data source, a time scale, a length of back history, a position sizing setting, or any combination thereof. The single window of the strategy monitor can display alerts for any trade strategy. Alerts generated by a trade strategy can be automatically converted to orders. Requests for updated data associated with a symbol associated with a trade strategy can result in a determination that a symbol is invalid. The determination that a symbol is invalid can occur when the number of time outs associated with the symbol equals a predetermined number. The user can configure an action to be taken if a symbol is determined to be invalid. The action taken can be deletion from a symbol set, change to a known valid symbol, removal from quarantine, or maintenance of the present state. The action can lead to updating historical data associated with the symbol.

In other examples, any of the aspects above can include one or more of the following features. A plurality of icons representative of data which can be graphed with respect to time can be displayed. A user can select at least one icon and drag it to a graph. The data associated with the icon can be graphed on a time axis, and the time axis can display other data associated with a trade strategy. The icons can present data such as earnings per share, insider transactions, CPI, CPI housing, employment level, gasoline, company balance sheet information, cash flow, liabilities, total sales, housing starts, the rate of inflation, market breadth, advancing issues, declining issues, analyst ratings, P/E ratios, opening and closing bids, standard deviations, simple moving averages, share price, volume, or any combination thereof.

In other examples, any of the aspects above can include one or more of the following features. A first subset of historical data corresponding to the first trade strategy can be locally cached. A second subset of historical data corresponding to the first trade strategy can be requested from a financial services provider. The second subset of historical data can be received and stored with the previously cached first subset.

The first trade strategy can be executed using at least a portion of the historical data in the cache. The second subset of historical data can be daily based historical financial data, intraday based historical financial data, or data that was streaming the previous day. The request for the second subset of historical data can be adjusted so the returned subset overlaps the locally cached first subset. The overlapping data between the first and second subsets can be compared, and the data in the cache corrected accordingly.

In another aspect, there is a method for backtesting a trade strategy. During this method, a back-end server can receive a first input from a first client device indicative of a first trade strategy and a first test parameter. The back-end server can obtain historical data associated with the first trade strategy, execute the first trade strategy on the historical data in accordance with the first test parameter, and transmit the results in a normalized format to the first client device. The back-end server can receive a second input from a second client device indicative of a second trade strategy and a second test parameter. The back-end server can obtain historical data associated with the second trade strategy, execute the second trade strategy on the historical data in accordance with the second test parameter, and transmits the results in a normalized format to the second client device.

In another aspect, there is a computer program product tangibly embodied in an information carrier. The instructions of the computer program product can cause a data processing apparatus to receive a first input from a first client device indicative of a first trade strategy and a first test parameter; obtain historical data associated with the first trade strategy; execute the first trade strategy on the historical data in accordance with the first test parameter; transmit the results in a normalized format to the first client device; receive a second input from a second client device indicative of a second trade strategy and a second test parameter; obtain historical data associated with the second trade strategy; execute the second trade strategy on the historical data in accordance with the second test parameter; and transmit the results in a normalized format to the second client device.

In another aspect, there is a system for developing and testing financial services that has a back-end server. The back-end server can receive a first input from a first client device indicative of a first trade strategy and a first test parameter; obtain historical data associated with the first trade strategy; execute the first trade strategy on the historical data in accordance with the first test parameter; and transmit the results in a normalized format to the first client device. The back-end server can also receive a second input from a second client device indicative of a second trade strategy and a second test parameter; obtain historical data associated with the second trade strategy; execute the second trade strategy on the historical data in accordance with the second test parameter; and transmit the results in a normalized format to the second client device.

In another aspect, there is a system for developing and testing financial services with a means for receiving and processing inputs associated with a plurality of trade strategies. The means can receive a first input from a first client device indicative of a first trade strategy and a first test parameter; obtain historical data associated with the first trade strategy; execute the first trade strategy on the historical data in accordance with the first test parameter; transmit the results in a normalized format to the first client device; receive a second input from a second client device indicative of a second trade strategy and a second test parameter; obtain historical data associated with the second trade strategy; execute the second trade strategy on the historical data in accordance with the second test parameter; and transmit the results in a normalized format to the second client device.

In other examples, any of the aspects above can include one or more of the following features. The first input can be defined using a Web service. The normalized format can be extensible markup language. The results transmitted to the first client device can be displayed. The first test parameter can be associated with raw profit/loss analysis based on a fixed currency amount, raw profit/loss analysis based on a fixed number of shares, profit/loss analysis based on a fixed currency amount wherein the starting capital is adjusted based on the profit/loss of a previous execution of the trade strategy, profit/loss analysis based on a fixed share per trade wherein the starting capital is adjusted based on the profit/loss of a previous execution of the trade strategy, supplied starting capital simulation mode using a fixed percent of existing equity available for the test, user definition of the number of shares or amount of currency used for each test, or any combination thereof. The user can generate a module representing a first trade strategy that can be stored on a storage device. An API can be defined for generating a module. The module can have a viewable document including one or more rules of the trade strategy. The module can have executable code not readable by the user. The module can be generated using a programming tool from a third party vendor, such as Eclipse from IBM, Visual Studio from Microsoft, or both.

Any of the aspects or features described herein may include one or more of the following advantages. A trader can view and activate multiple trade strategies in the same window and monitor alerts generated from those heterogeneous trade strategies using the same window. Bad symbols are detected and can be managed by user preference. Fundamental data can be added to a display without having to reprogram or use a rules wizard. Storing historical data locally and updating enables faster access to the data, less network resource monopolization, and greater access to corrected data. Backtesting can be performed using a thin client model, conserving and/or minimizing desktop resources needed by traders to perform analytics. Trade strategies can be easily developed through the use of extended objects, enabling a trader to generate and share a trading strategy without revealing the underlying code or algorithms for that trading strategy.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Techniques for financial services systems and methods are herein described. As described in more detail below, components of some of the embodiments of systems may include a financial services application that may be displayed on a desktop or client computer system, one or more server systems, local storage units, and one or more central entities. Various features of the financial services systems enable or facilitate trade strategy development, testing, and execution.

[Strategy Monitoring]

Figure 1:
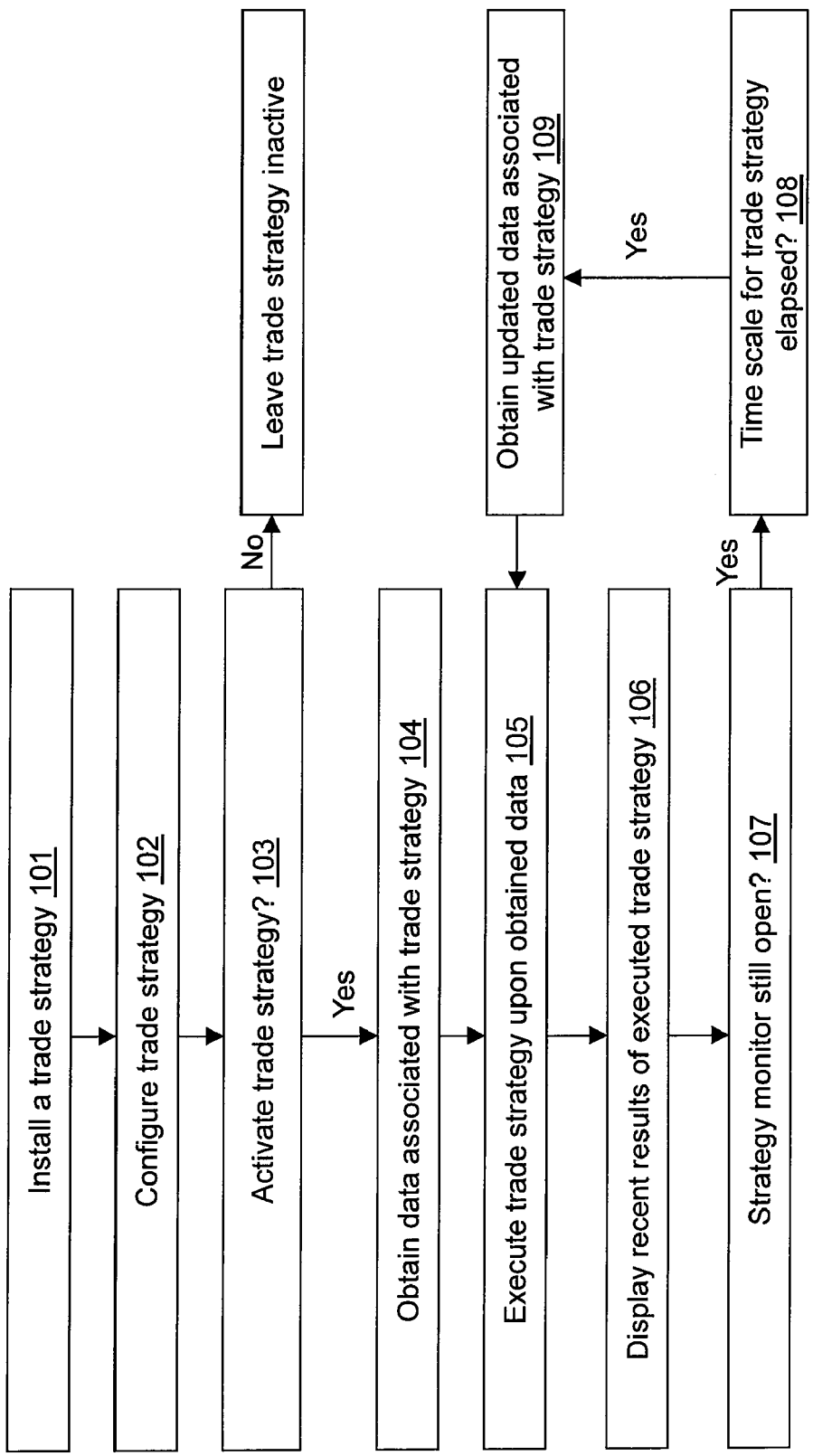
FIG. 1 illustrates a process of installing, configuring, and executing a trade strategy in the strategy monitor.
Figure 2:
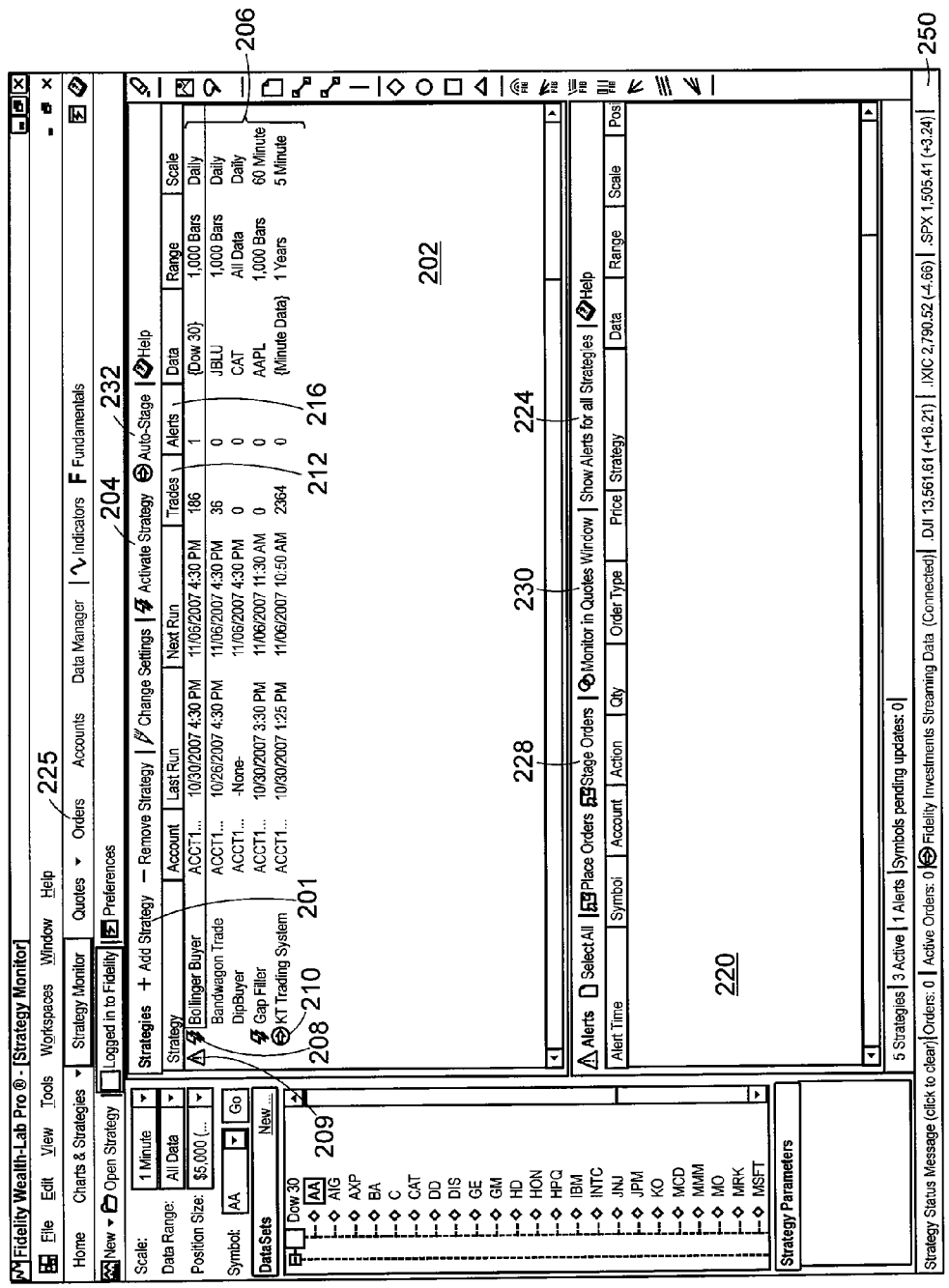
FIGS. 2, 3, and 4 illustrate examples of physical displays of a strategy monitor.
Figure 3:
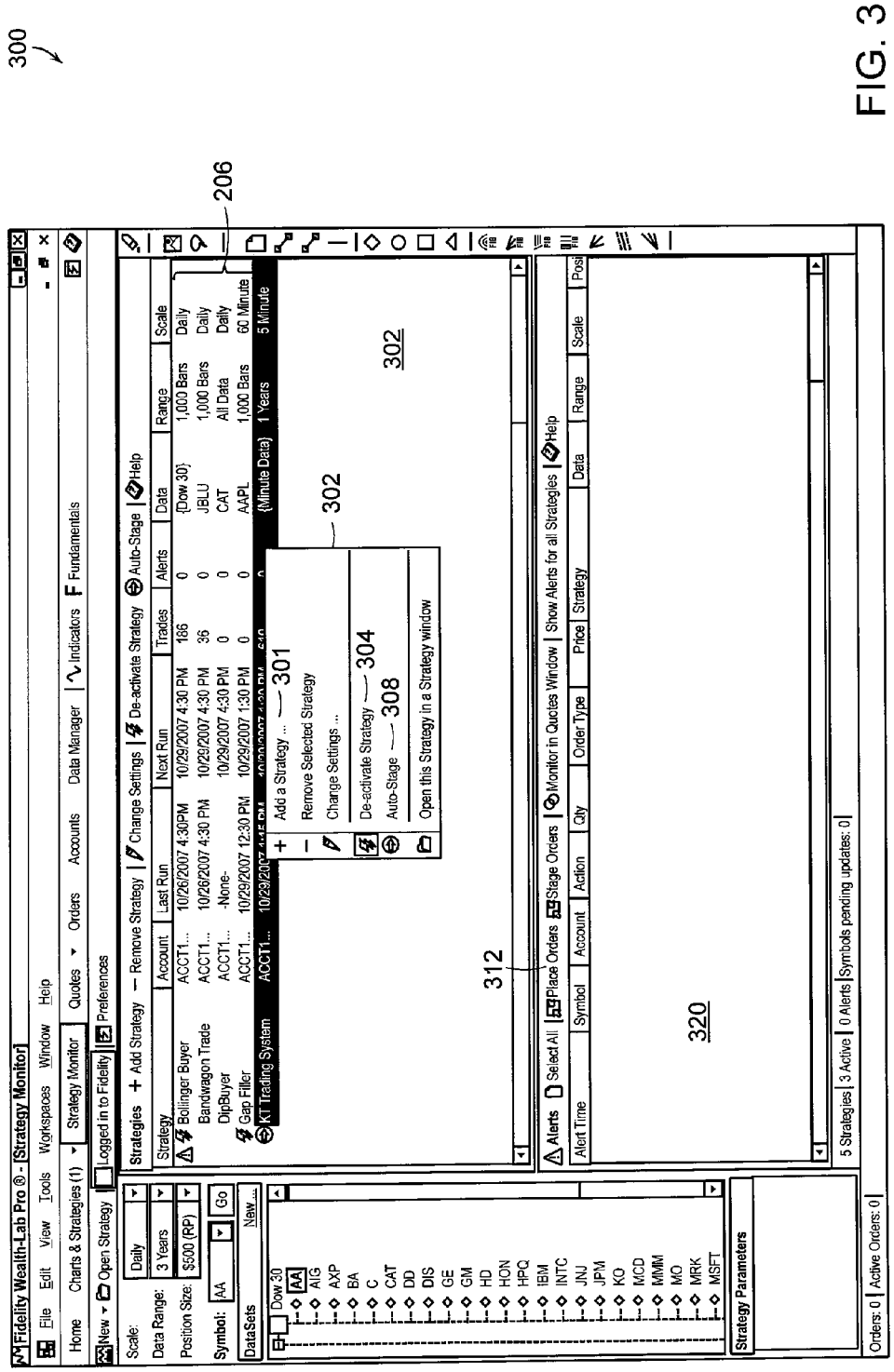
Figure 4:
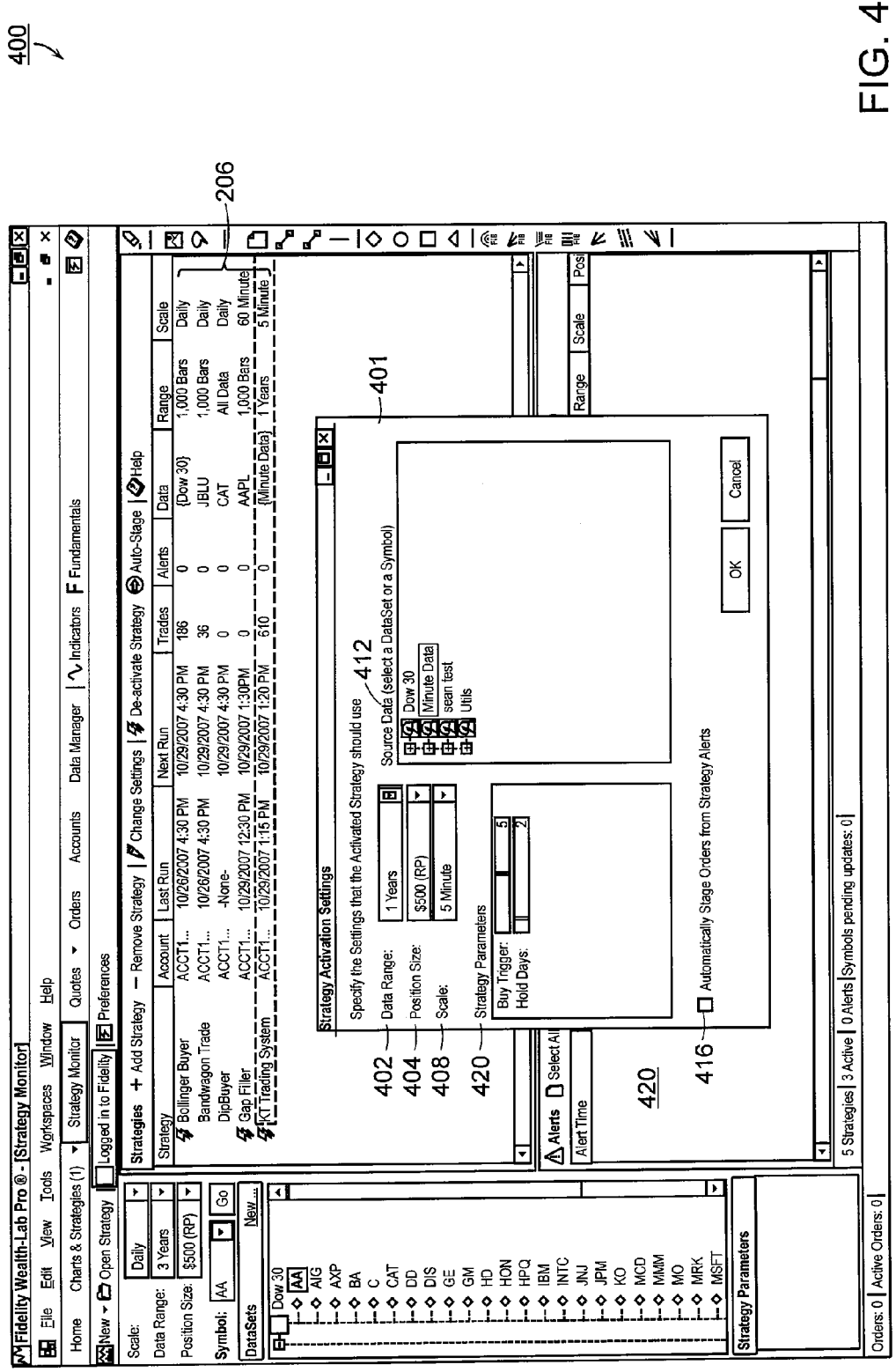
Figure 5:
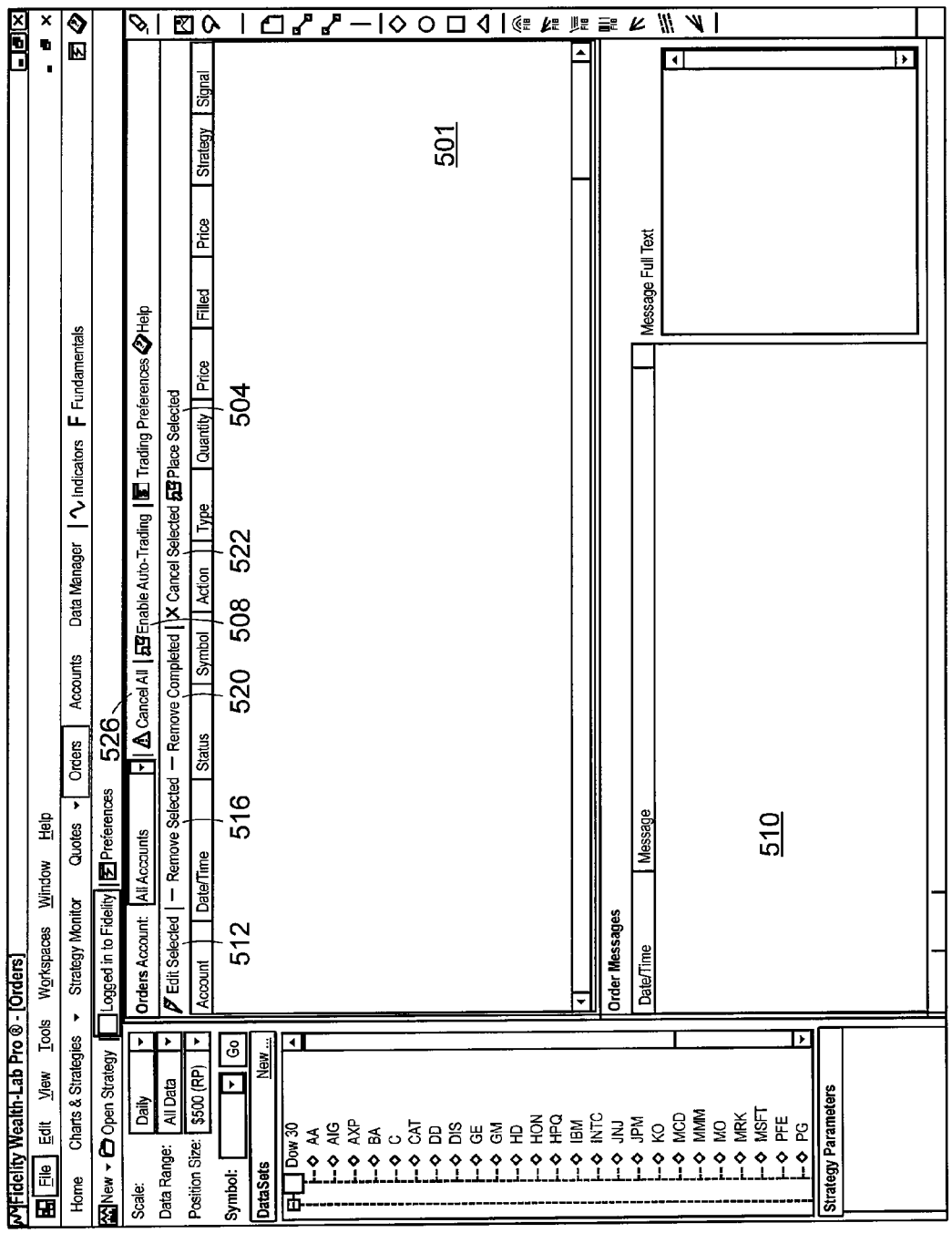
FIGS. 5, 6, 7, 8, and 9 illustrate examples of features that may be used in conjunction with the strategy monitor.
Figure 6:
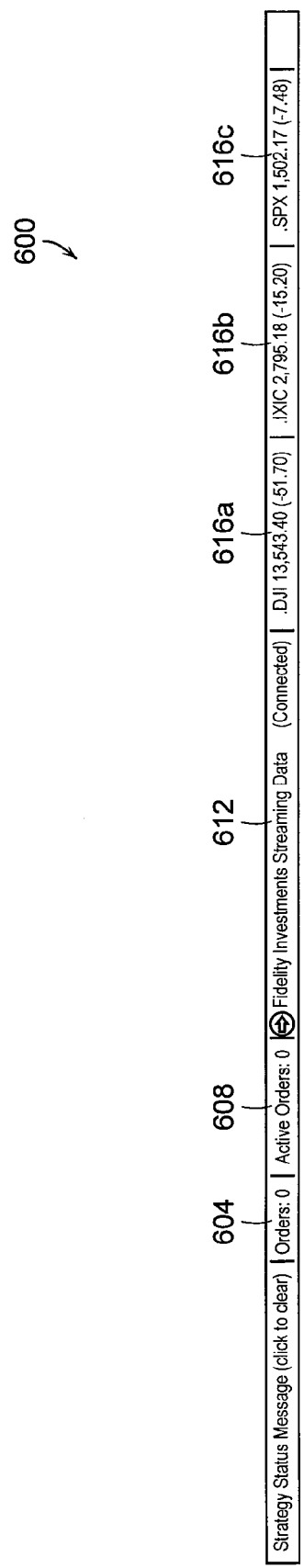
Figure 7:
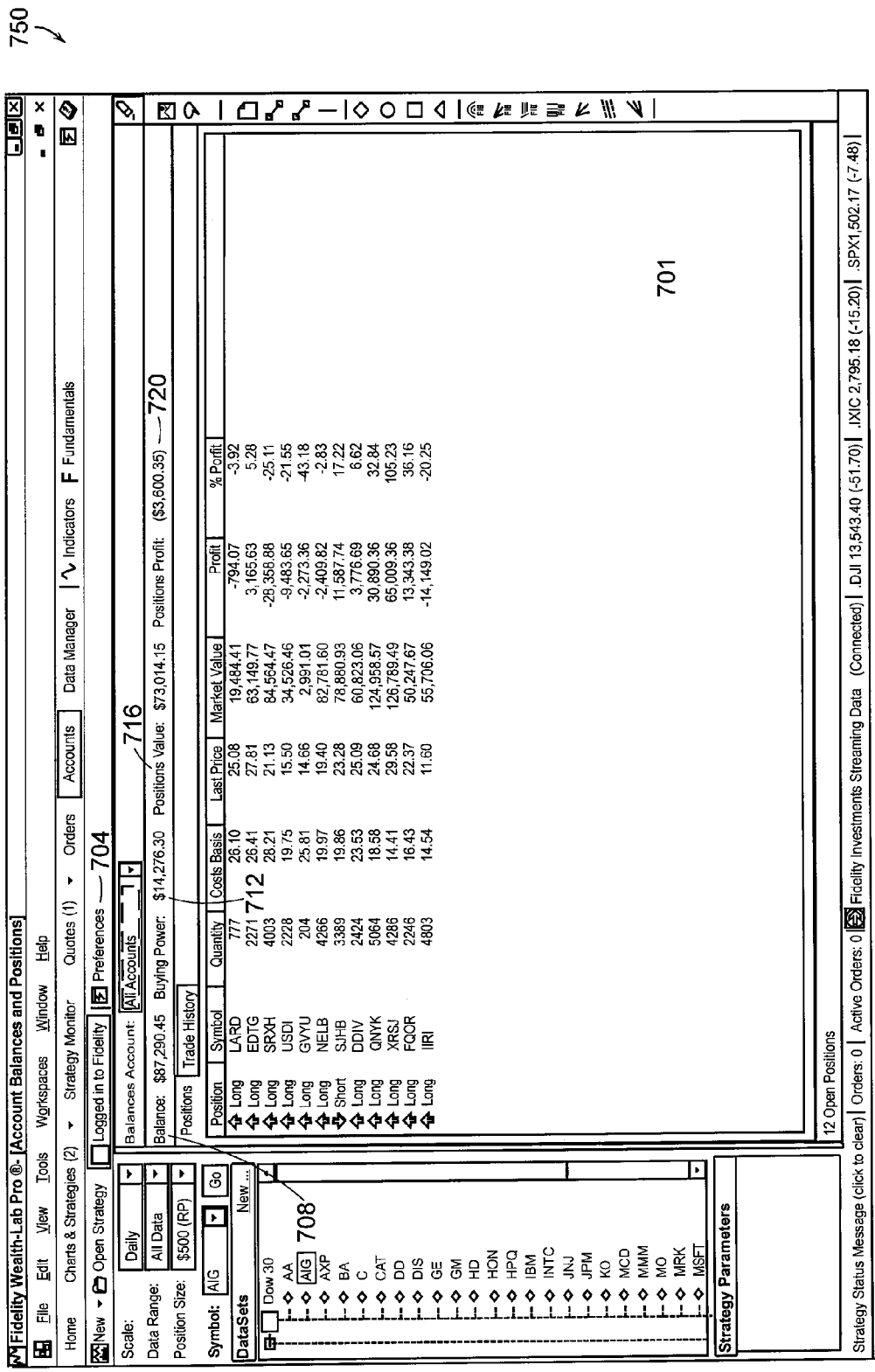
Figure 8:
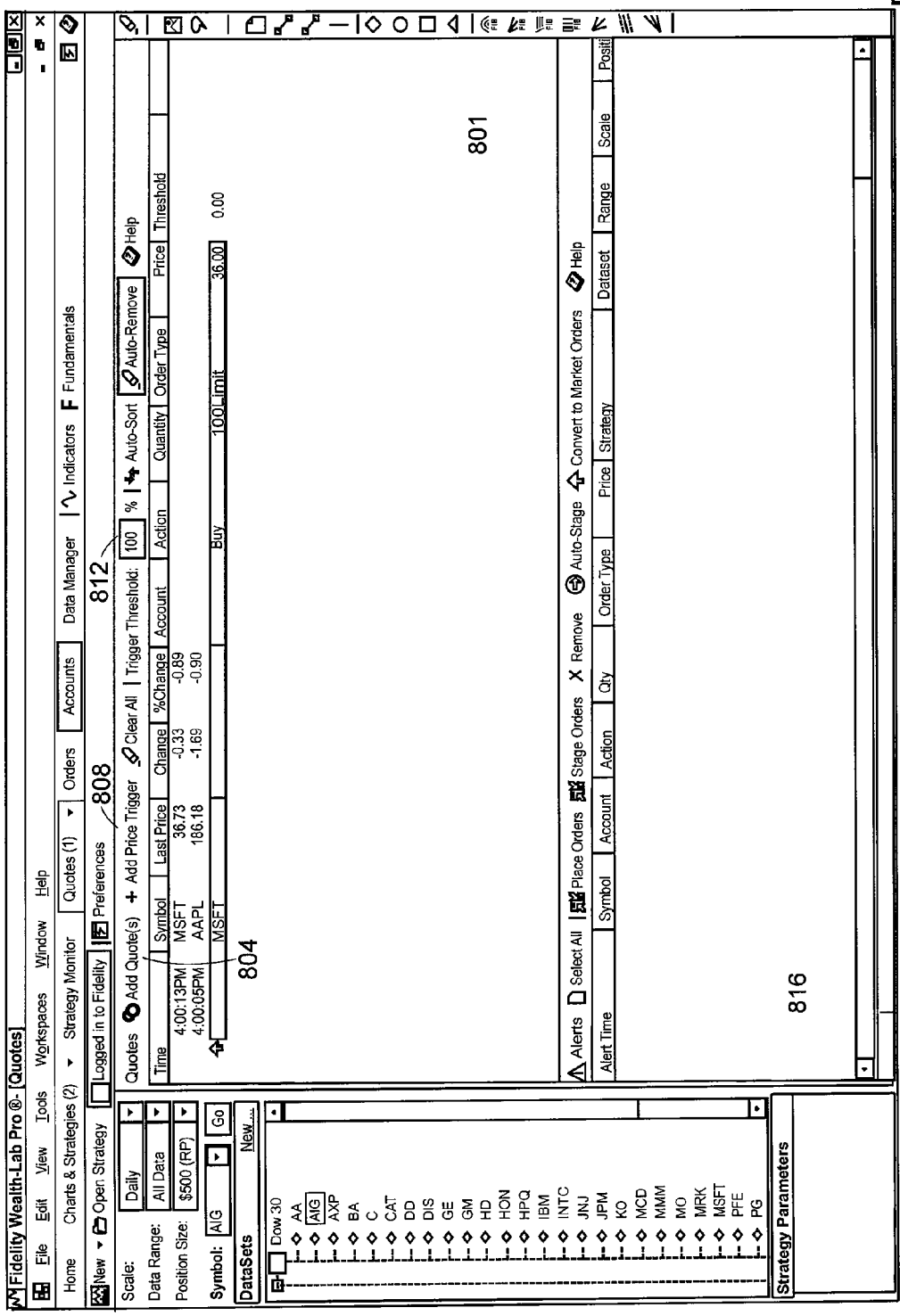
Figure 9:
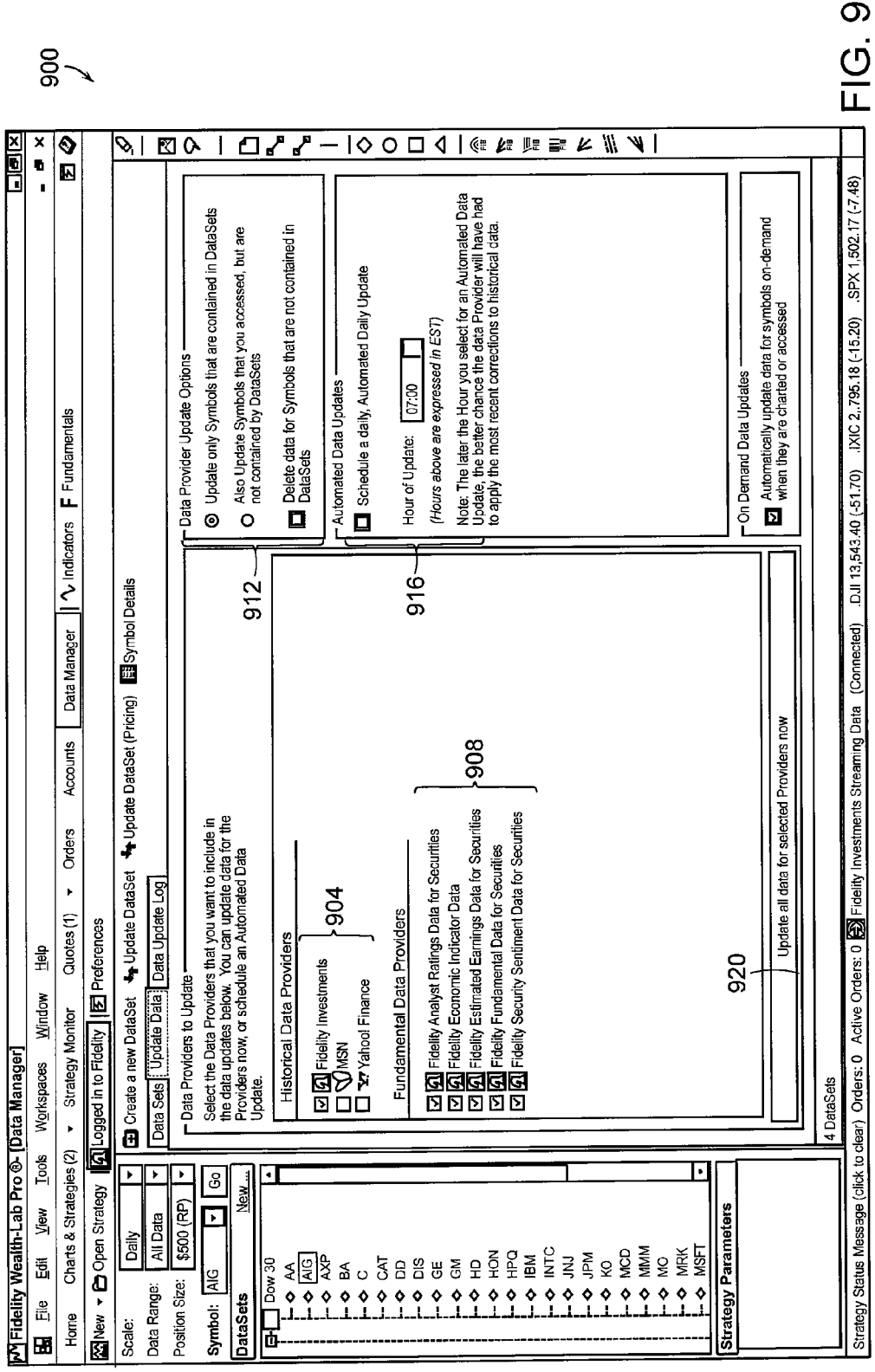

FIGS. 1, 2, 3, and 4 illustrate some features of the financial services system, in particular related to a strategy monitor within the financial services application. FIG. 1 shows an exemplary process 100 of installing, configuring, and executing a trade strategy in the strategy monitor. FIGS. 2, 3, and 4 show examples of physical displays 200, 300, and 400 of a strategy monitor, whereupon display elements such as icons or buttons corresponding to the steps of installing, configuring, and executing a trade strategy may be displayed. FIGS. 5, 6, 7, 8, and 9 show physical displays 500, 600, 700, 800, and 900 of the financial services application that describe other features that may be used in conjunction with a strategy monitor.

Referring to FIG. 1, the user may install one or more trade strategies on the strategy monitor (Step 101). For example, referring to an exemplary display 200 in FIG. 2, the user may install a trade strategy by clicking "Add Strategy" button 201. Alternatively, in another exemplary display 300 in FIG. 3, the user may install a trade strategy by right clicking and selecting "Add a Strategy" option 301 from a generated menu 302 displayed on top of a strategy monitor window 202. Installation places the trade strategy in the single window of the strategy monitor (e.g., window 202).

The user then configures the trade strategy (Step 102). Configuration may be achieved by selecting parameters defining conditions under which the trade strategy will be executed. The exemplary display 400 of FIG. 4 illustrates a window 401 that is generated to enable a user to input values for certain configurable parameters associated with a trade strategy. Parameters may include the amount of data that will be used during a backtest ("data range" 402), the amount of money or shares allocated to each trade ("position size" 404), the frequency of data updates ("scale" or "time scale" 408), or the one or more stock symbols the strategy will be tested on ("data set" or "symbol set" 412). The user may also choose to have alerts generated by the trade strategy automatically converted to orders ("Automatically Stage Orders from Strategy Alerts" 416). A user may also configure parameters 420 that depend upon the trade strategy itself. Although not shown, the user may designate the real or hypothetical account the trades generated from a trade strategy should be placed in.

After a trade strategy has been configured, the user may choose to activate a trade strategy or leave it dormant (Step 103). The user may activate a trade strategy by clicking a button that controls whether the trade strategy is activated (e.g., "Activate/De-activate Strategy" element 204). Alternatively, the user may activate a trade strategy by right clicking a pointing device, such as a mouse, to generate the menu element 302 and selecting option 304 from the menu 302 that activates the strategy. The user may later de-activate strategies in the same fashion.

Once a trade strategy is activated, data associated with the trade strategy is obtained (Step 104). The data may include historical price data or intraday data. Part or all of the obtained data may be stored in a local storage unit. The trade strategy is then executed against the data (Step 105), and the results of the executed trade strategy are displayed in the single strategy monitor window (Step 106). The results may include trade opportunities identified by the trade strategy, also known as alerts. As long as the strategy monitor remains open (Step 107), it checks whether the time between data updates has elapsed (Step 108). If so, updated data associated with the trade strategy is obtained (Step 109). The trade strategy is re-executed against the updated data and the results are again displayed.

In a feature of the strategy monitor, a plurality of trade strategies are installed, configured, activated, and executed independently from one another. The trade strategies may have different data ranges, time scales, symbol sets, accounts, or individualized parameters from one another. Separate instances with different configurations of the same trade strategy may be run within the strategy monitor. Multiple trade strategies may be executed and the alerts for each trade strategy displayed in the strategy monitor. Some trade strategies may be activated while others may be left inactive.

In another feature of the strategy monitor, activated trade strategies are automatically executed whenever the financial application is opened or accessed by the user.

In another feature of the strategy monitor, the strategy monitor displays a line item for each trade strategy being run by the system, as shown in area 206 of FIGS. 2, 3, and 4. The line item may include Activate/De-activate icon 208 to signify whether the strategy has been activated, Alerts icon 209 to signify whether alerts have been generated for the strategy, Auto-Stage icon 210 to signify whether alerts generated by the trade strategy are being automatically converted to orders, the number of trades 212 generated by the strategy, and the number of alerts 216 generated in the last execution of the trade strategy. Advantageously, a trader can view status and other summary information about all of the trading strategies in a single window, without having to open multiple windows, one for each strategy, and then click among them to view the same type of information.

In another feature of the strategy monitor, the alerts generated by one or more trade strategies are displayed. The alerts may be shown, for example, in a section 220 of the strategy monitor designated for displaying alerts. The user may select the "Show Alerts for All Strategies" button 224 to display all alerts generated by all the trade strategies. Advantageously, a trader can view alert information about all of the trading strategies in a single window, without having to open multiple windows, one for each strategy, and then click among them to view the same type of information. Although not shown, the user may select the line item of a trade strategy to display its alerts only in the alerts window 220.

In another feature of the strategy monitor, alerts may be monitored from Quotes Window 801. The user may transfer an alert to Quotes Window 801 by selecting the alert and clicking "Monitor in Quotes Window" button 230.

In another feature of the strategy monitor, alerts may be converted into orders. Converted alerts may be placed in a section of the application designated for displaying orders, Orders Window 501. This section designated for displaying orders is displayed when, for example, the user clicks on the "orders" tab element 225. The user may convert an alert to an order by clicking on an alert and then clicking "Stage Orders" button 228.

The user may automatically convert all alerts generated by a trade strategy to orders by clicking the "Auto-Stage" button 232. The user may also automatically convert all alerts generated by a trade strategy to orders by right clicking and selecting "Auto-Stage" option 308 from the menu 302. The user may make any order active by selecting the order and clicking on "Place Orders" button 312, or selecting an order in Orders Window 501 and clicking on "Place Selected" button 504. The application may notify the user when the order becomes active or if an error has occurred, for example, by placing a message in Order Messages Window 510. Both active and inactive orders may be displayed in Orders Window 501.

In another feature of the financial services application used in conjunction with the strategy monitor, the user may have generated orders automatically placed by clicking on "Enable Auto-Trading" button 508. The user may edit an order by selecting the order and clicking on "Edit Selected" button 512. The user may delete an order by selecting the order and clicking on "Remove Selected" button 516. Once an order has been executed, the user may remove it from Orders Window 501 by selecting the order and clicking on "Remove Completed" button 520. If the user has placed an order and wishes to cancel it, he may select the order and click on "Cancel Selected" button 522. If the user wishes to cancel all pending orders, he may click on "Cancel All" button 526.

In another feature of the financial services application, status bar 600 displays information relevant to current trading. Status bar 600 may appear at the bottom of the financial services application, as shown by status bar 250 in FIG. 2 and status bar 750 in FIG. 7. Status bar 600 displays information such as the number of orders generated in Orders field 604, the number of orders placed in Active Orders field 608, the connectivity to streaming data from a remote source in Streaming Data field 612, and current index information in field 616.

In another feature of the financial services application, accounts are managed in accounts window 701. Information from individual or all accounts may be displayed by selecting the desired option from menu 704. The user may view, among other matters, the total account balance in Balance field 708, the amount available to make purchases in Buying Power field 712, the value of the financial instruments held in Positions Value field 716, and the profit from past activity with financial instruments in Positions Profit 720.

In another feature of the financial services application, individual financial instruments may be tracked and potentially converted into orders in quotes window 801. The user may add a symbol to track by clicking on "Add Quote(s)" button 804. The user may set a threshold for identifying a buy or sell opportunity by clicking on "Add Price Trigger" button 808. The user may add a buffer to the threshold by adjusting the percentage in "Trigger Threshold" field 812. When the price for a quote hits the trigger or trigger threshold, an alert is generated and placed in alerts window 816. Such alerts may be converted to orders in a similar manner in which alerts generated from trade strategies are converted to orders.

In another feature of the financial services application, the user may set the application to obtain updated data through data manager 900. The user may select the data sources from which it will obtain updated data, including but not limited to historical data providers 904 and fundamental data providers 908. The user may select which symbols will be updated through Update Options 912. The user may set an automatic updating schedule through Automated Data Updates 916. The user may initiate the process of obtaining updated data by clicking the "Updated all data for selected Providers now" button 920.

[Bad Symbol Management]

Figure 10:
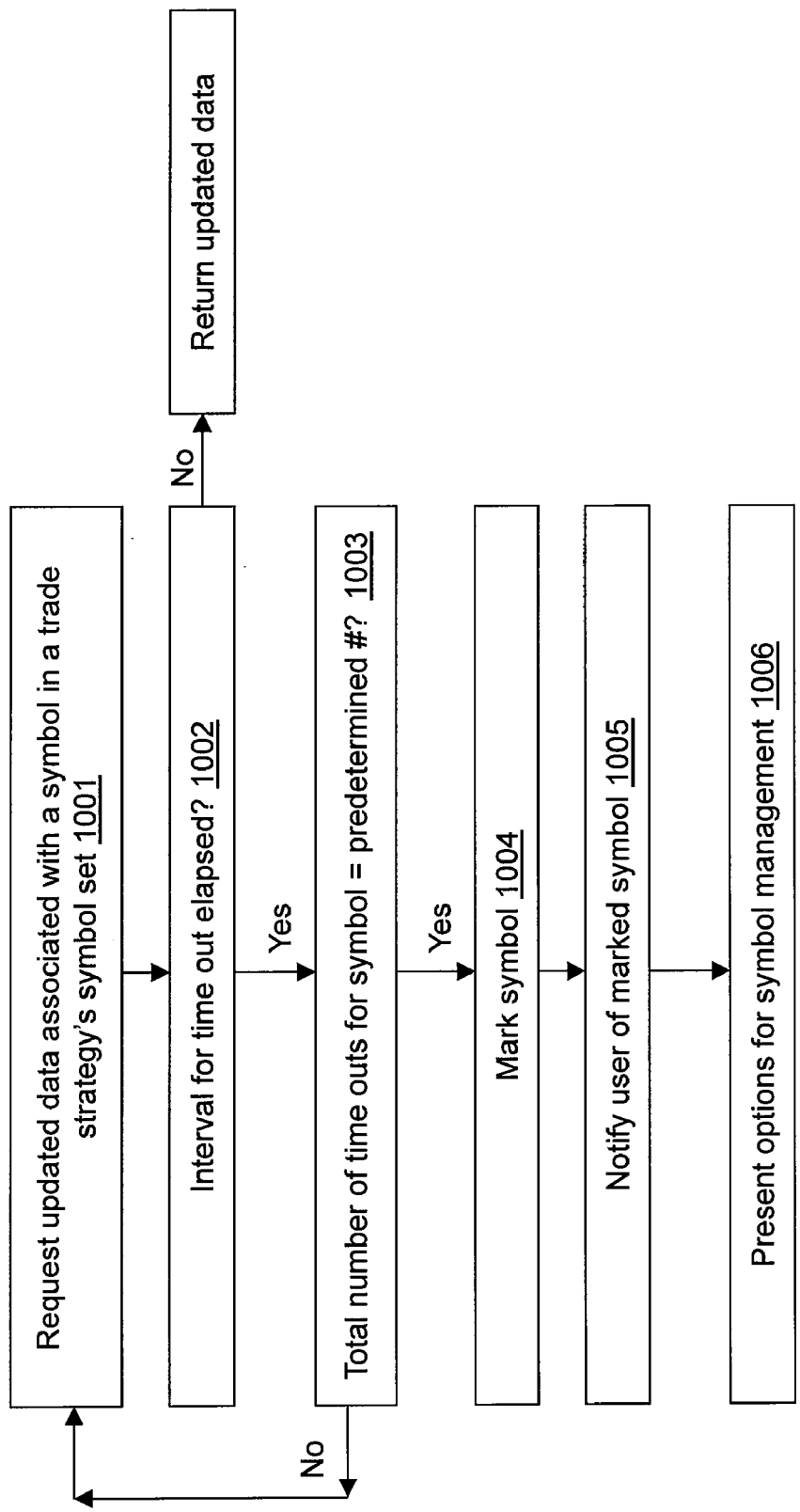
FIG. 10 illustrates an example of a process of bad symbol management.
Figure 11:
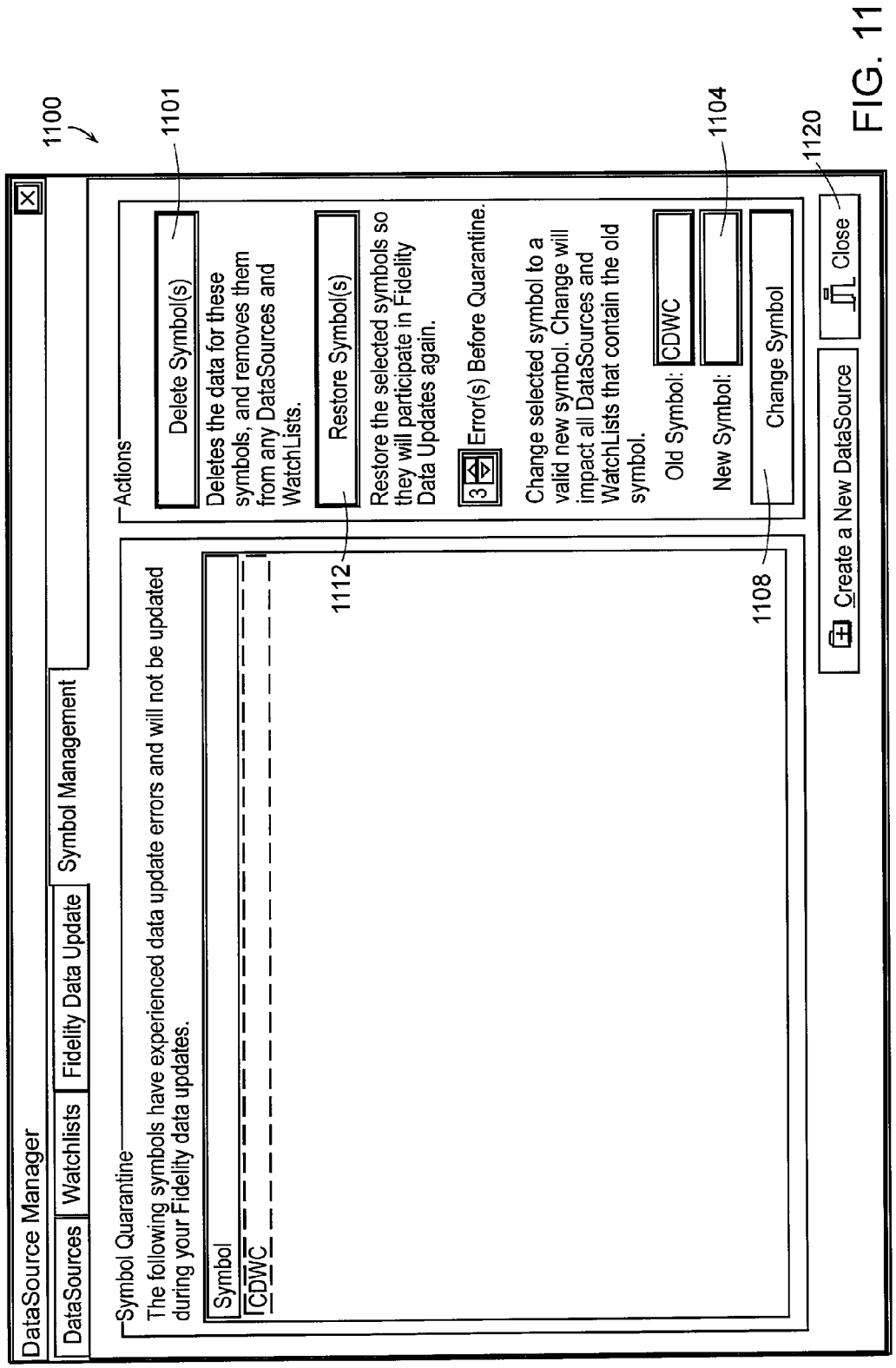
FIG. 11 illustrates an example of a physical display used in the process of bad symbol management.

FIGS. 10 and 11 show an example of another feature of the financial services system, bad symbol management. Bad symbols are sometimes also known as invalid symbols. Symbols may become invalid due to various business events, such as company mergers, bankruptcy, or symbol suspension due to lack of compliance with securities regulations. A bad symbol cannot be recognized as associated with a business entity. Thus, requests for data associated with bad symbols are unsuccessful because the data cannot be located, and the system may time out after requested data associated with a bad symbol has not been located and returned after a designated interval. When the strategy monitor requests data or updated data associated with a trade strategy (e.g., any of the line items activated in section 206) for executing the trade strategy against the most recent data, bad symbol management may expedite the data transfers by reducing the number of requests for updated data or correcting the types of requests being made.

FIG. 10 demonstrates an example of the process of bad symbol management. Updated data associated with a symbol in a trade strategy's symbol set is requested (Step 1001). If the requested data is not returned within a designated interval, the system times out (Step 1002). The total number of time outs associated with the symbol is compared to a designated, adjustable number (Step 1003). In some embodiments, the designated number may be three. If the total number of time outs is equal to the designated number, the symbol is marked as bad (Step 1004). The symbol may be marked by being flagged or quarantined. The user is notified that the symbol has been marked (Step 1005), and the user is presented with options for handling the bad symbol (Step 1006). Alternatively, the user may elect not to receive notifications when symbols are marked.

FIG. 11 shows a possible display 1100 of options for handling a marked symbol. A first manner of treating a marked symbol may be to delete the symbol by clicking a "Delete Symbol(s)" button element 1101. If this option is selected, the symbol is deleted from the symbol set associated with the trade strategy, historical data associated with the symbol is deleted from the local storage unit that stores at least partial historical data associated with the trade strategy, and the strategy monitor ceases to request updated data on the symbol whenever the trade strategy is executed.

A second manner of treating a marked symbol may be to change the symbol to a known valid symbol. The user selects the known valid symbol that will be substituted for the marked symbol. For example, the user may input the symbol manually in a "New Symbol" field 1104 and select a "Change Symbol" button 1108. Once a known valid symbol is selected, the system replaces the marked symbol of the symbol set associated with the trade strategy with the known valid symbol. The historical data associated with the known valid symbol is transferred and at least part of the historical data is stored in the local storage unit that stores at least partial historical data associated with the trade strategy. If the local storage unit has historical data associated with the marked symbol, it is overwritten or allowed to be overwritten.

A third manner of treating a marked symbol may be to remove the symbol from quarantine by selecting a "Restore Symbol(s)" button 1112. The removal from quarantine restores the symbol such that the application will continue making requests for updated data associated with the symbol whenever the trade strategy is executed.

A fourth manner of treating a marked symbol may be to ignore the notification by clicking a "Close" button 1120. If the user ignores the notification, no further requests for updated data associated with the symbol may be made. However, the symbol remains in quarantine and associated data presently in the local storage unit remains there.

[Drag and Drop Data]

Figure 12:
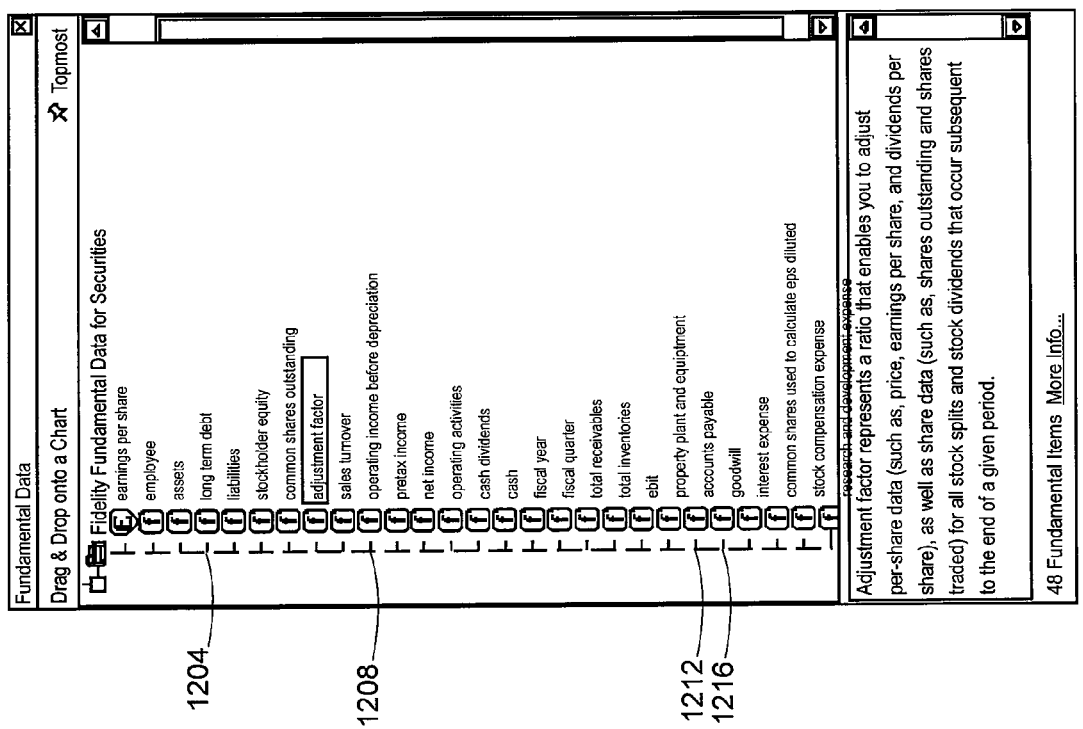
FIGS. 12, 13, 14, and 15 illustrate examples of physical displays of a drop and drag feature for adding fundamental data to a strategy.
Figure 13:
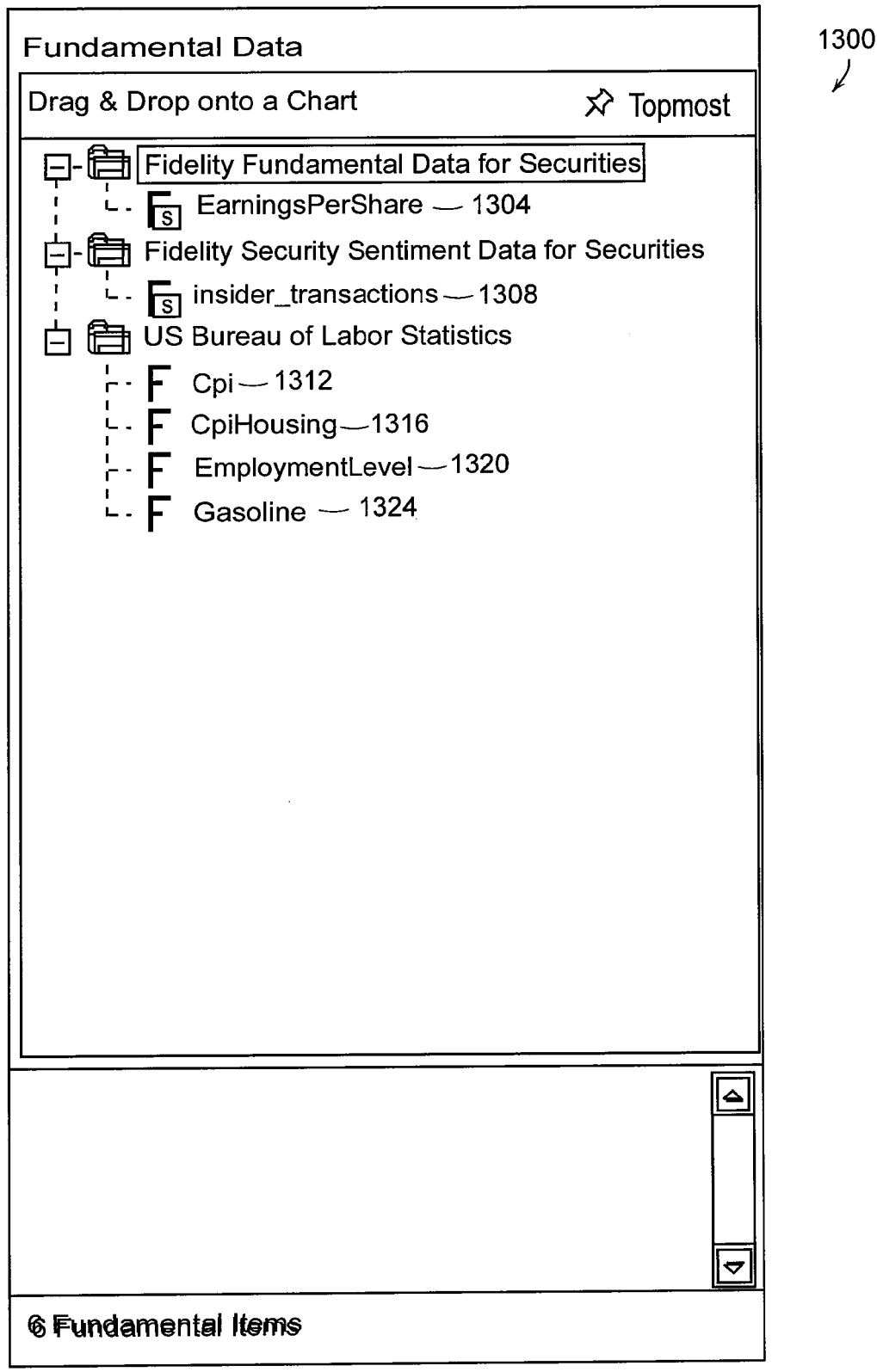

FIGS. 12, 13, 14, and 15 show examples of another feature of the financial services system, the ability to drag-and-drop fundamental data, economic data, and technical indicators into a graphical display for comparison with other data. Various types of information may be made available to users for comparison. FIG. 12 shows an embodiment of a table 1200 that the system displays from which the various types of data may be dragged. The exemplary provision of table 1200 includes fundamental data such as long term debt 1204, operating income before depreciation 1208, accounts payable 1212, and goodwill 1216. FIG. 13 shows another embodiment of a table 1300 that the system displays from which the various types of data may be dragged. The exemplary provision of table 1300 includes fundamental data such as earnings per share 1304, security sentiment data such as insider transactions 1308, and economic data such as CPI 1312, CPI Housing 1316, employment level 1320, and Gasoline 1324.

Figure 14:
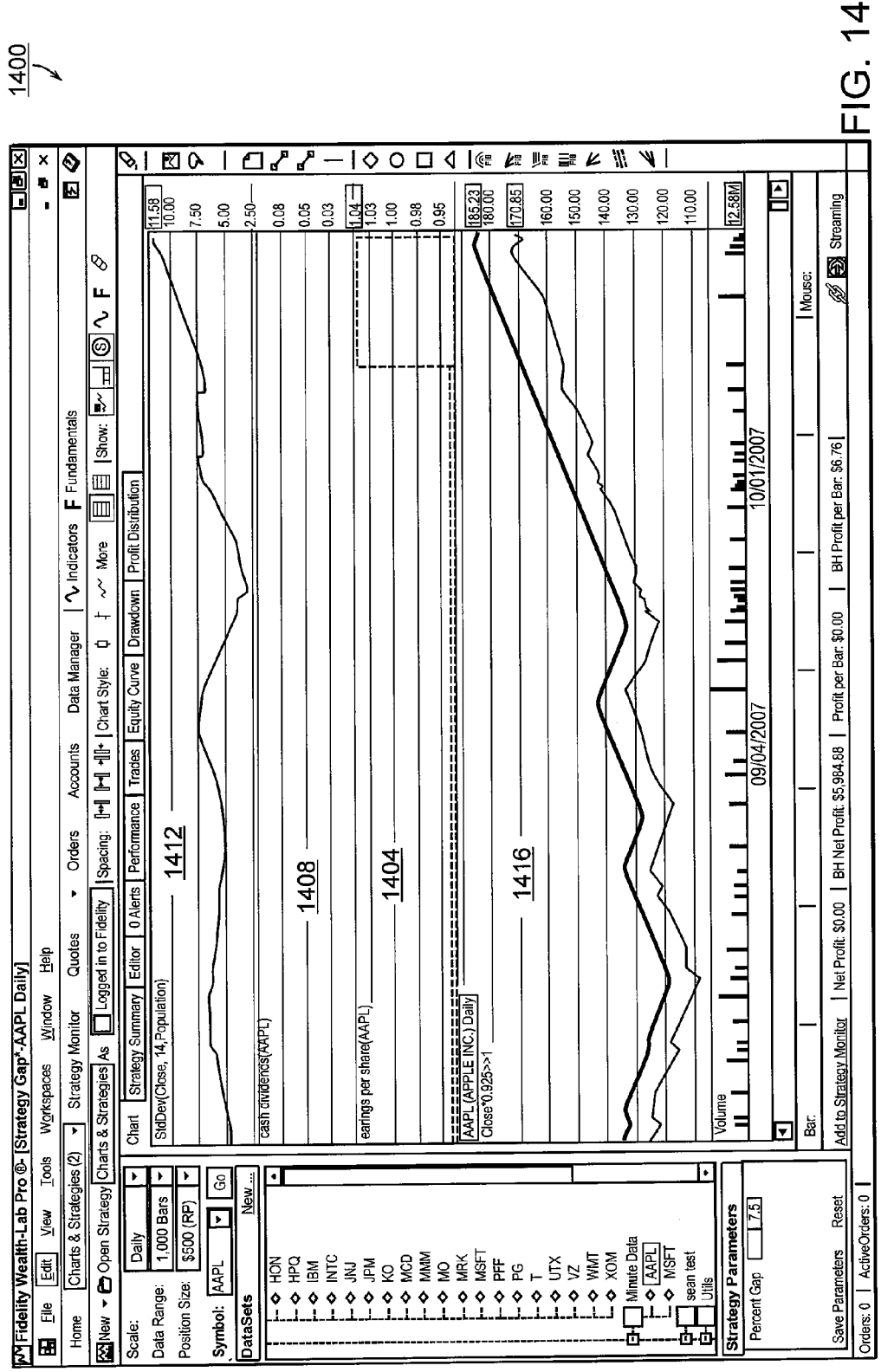
Figure 15:
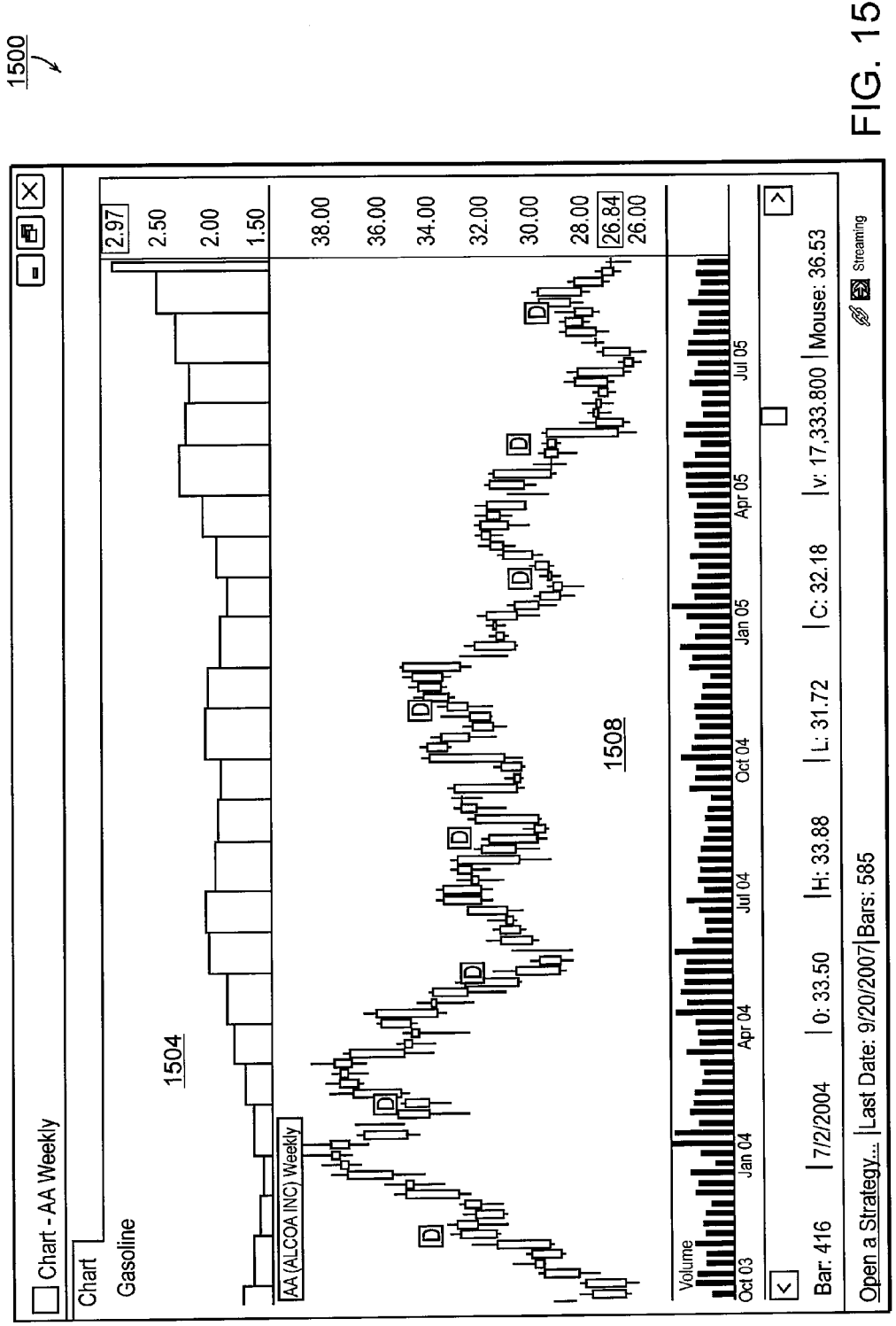

FIG. 14 shows a display 1400 in which data of various types are aligned on the same time axis so that a trader can visually see where there may be a correspondence between trading data and other data. In display 1400, the provision of graphed data such as earnings per share 1404, dividends 1408, and standard deviation 1412 is aligned on the time axis with the graphed trading data price and volume 1416. Similarly, FIG. 15 shows a display 1500 that includes the provision of graphed data such as the price of gasoline 1504 and the price of a security 1508 aligned to the same time axis. Other examples of data that may be displayed, although not shown, include company balance sheet information such as cash flow, liabilities, or total sales; other types of economic data such as housing starts or the rate of inflation; market sentiment data such as market breadth, advancing issues, or declining issues; other security sentiment data such as analyst ratings; and technical data such as P/E ratios, opening and closing bids, standard deviations, and simple moving averages.

FIGS. 12 and 13 show exemplary displays 1200 and 1300 for making drag-and-drop data available, namely, floating windows in which categories of data are organized into folders. FIG. 14 shows that data may be displayed in a separate pane in the chart window. Although not shown, data may also be presented as annotations on a chart, and a list of data may also appear when the user clicks on buttons for displaying the types of information available for comparison.

By selecting, dragging, and dropping a piece of data into the graphical display, the data is displayed, for example as illustrated in displays 1400 and 1500. When multiple pieces of data are selected, the selected data are displayed in a manner that permits comparison between the data over the same timeframe. Each set of data may be graphed along separate, aligned axes in the same window. Although not shown, the displays of data may be superimposed upon one another on the same axis. The timeframe corresponding to the data may be adjusted to enable the user to compare more or less data. Advantageously, the trade strategy tool enables a trader to generate the display 1500 simply by dragging the gasoline folder element 1324 from displayed table 1300 to a display graphing the share price (e.g., the graphed data 1508) without requiring any programming experience by the trader.

The user may also delete one or more types of data and remove its depiction from the graphical display. The user may also select other types of data for comparison to find trends suggesting a pattern for trade opportunities.

[Caching and Local Storage of Historical Data]

Figure 16:
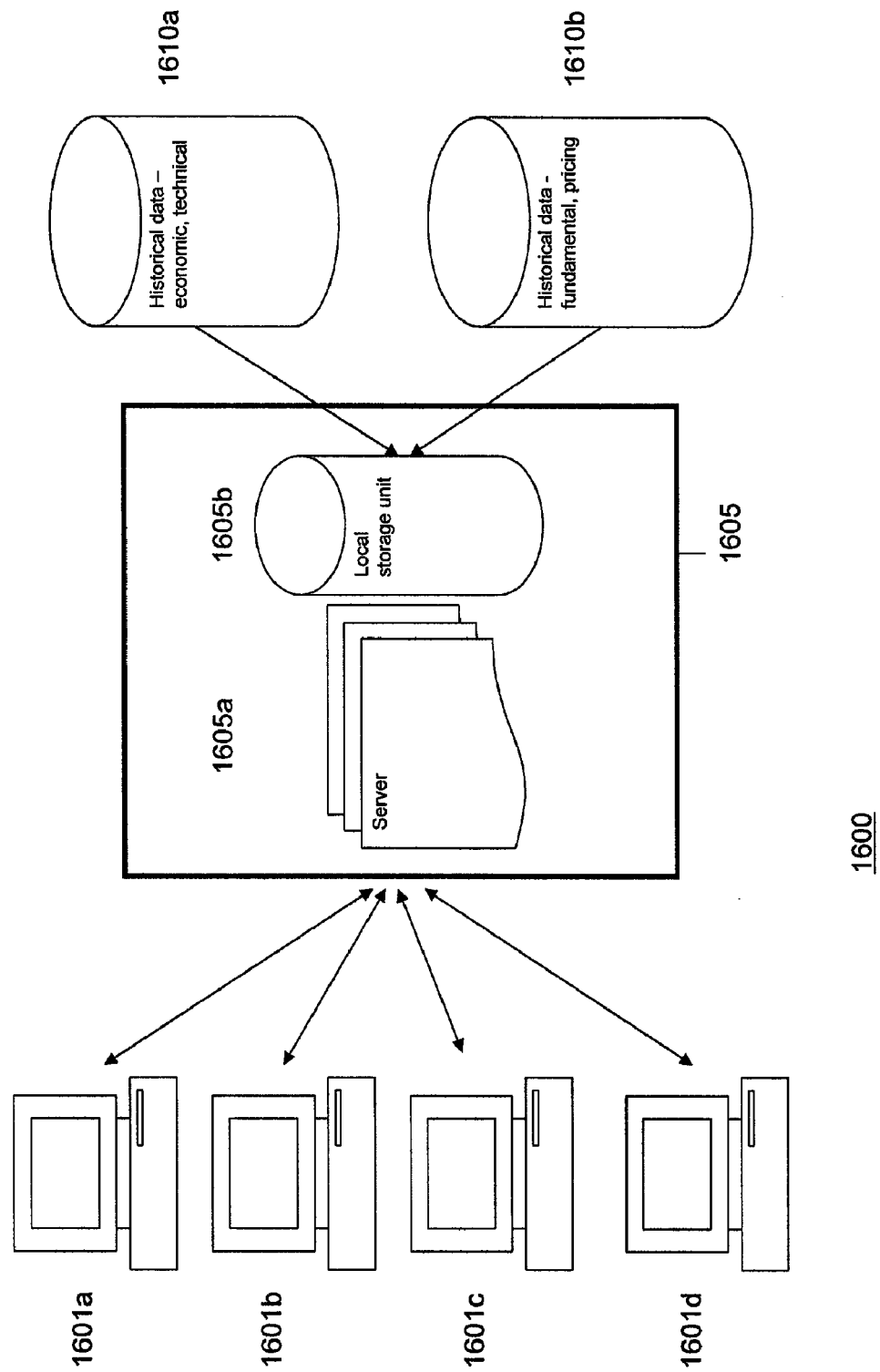
FIG. 16 illustrates an example of a thin-client system.
Figure 17:
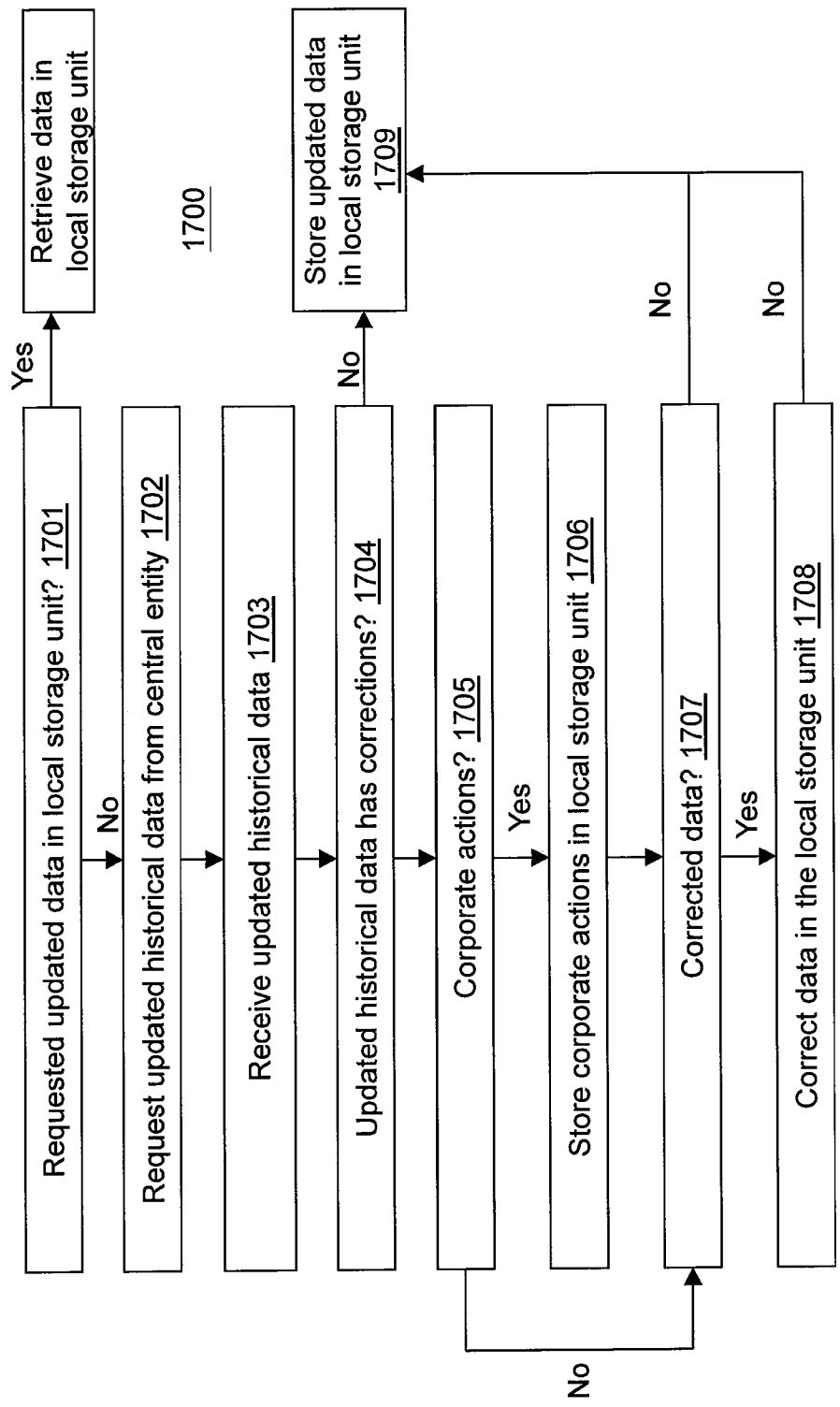
FIG. 17 illustrates an example of a process of historical data caching.

FIGS. 16 and 17 show an example of another feature of the financial services system, the storage and correction of at least some historical financial data associated with trade strategies on a local storage unit. The local storage unit may be located on a server or on a desktop. FIG. 16 shows examples of the components of an exemplary financial services system 1600. FIG. 17 illustrates an exemplary process flow 1700 when historical financial data in the local storage unit is updated.

FIG. 16 shows the system components. The system 1600 includes a plurality of front-end entities (e.g., computing devices, desktops, laptops, PDAs, and the like) 1601a, 1601b, 1601c, 1601d, generally referred to as 1601 each hosting a web-based financial services application, which, for example, can be based in or through a Web browser. The front-end entity 1601 could be, for example, a user desktop computer system, consuming client computer system, or consuming server based system. Each front-end entity is connected to a back-end entity 1605. The back-end entity could be a server side computer system. The back-end entity can include a server 1605a and a local storage unit 1605b. The front-end entities 1601 communicate with the back-end entity 1605 through a distributed computer system channel, such as the Internet or other communication network. The back-end entity 1605 is connected to a central entity 1610, which stores, for example, historical financial, economic, and technical data.

FIG. 17 shows an example of the process 1700 when historical financial data is updated. Historical financial data may be updated, for example, when the time scale for a trade strategy has elapsed. In such a case, updated data associated with a trade strategy is obtained and the trade strategy re-executed upon the most recent historical financial data. The financial data may be that of equities, equity options, futures, futures options, or mutual funds. It may also be any other type of derivative-based historical market data on any known or unknown financial market instrument.

The local storage unit, which stores at least part of the historical financial data associated with the trade strategy, is first checked to determine if it has updated financial data (Step 1701). If the updated data is not found in the local storage unit, a request for the updated data is sent to a central entity with databases of historical financial data for symbols (Step 1702). The updated data is received (Step 1703). The received data may comprise at least the most recent historical data except recently streamed data whose corrections are not yet available. The response may comprise at least the most recent historical data except the data corresponding to a designated interval of time. The response may comprise at least a clean, corrected copy of recently streamed data. The response may comprise at least new data made available within the last market business day. The response may comprise daily based historical financial data or intraday based historical financial data.

The updated data is checked for corrections (Step 1704). If there are no corrections, the updated data is stored in the local storage unit (Step 1709). If the updated data has one or more corrections, it is determined if one or more corrections is a corporate action (Step 1705). If there are one or more corporate actions, they are stored in the local storage unit alongside the historical data (Step 1706). If the updated data has one or more corrections, it is then determined if one or more corrections reflect corrected data (Step 1707). The determination of corrected data may be performed by comparing historical data for a recent, designated length of time to at least part of the received data and determining if the recently received data is corrected data. If it is determined that one or more corrections reflect corrected data, data in the local storage unit is corrected (Step 1708) and the rest of the updated data is stored in the local storage unit (Step 1709).

In another embodiment of the feature, received historical data may be discretely cached. In another embodiment of the feature, when a request is made for updated data, the period of time associated with the updated data is extended so that the received data will overlap at least part of the data stored in the local storage unit. At least part of the received data will be compared with at least part of the data in the local storage unit. If corrections need to be made, the local storage unit will be corrected accordingly.

In yet another embodiment of the feature, the local storage unit is automatically updated after designated intervals of time. The interval of time may be a year, quarter, month, week, or day. It may also be a period of 6, 3, or 1 hours. It may also be a period of 30, 15, 10, 5, 3, or 1 minutes.

[Backtesting Server Computer System Web Service]

Figure 18:
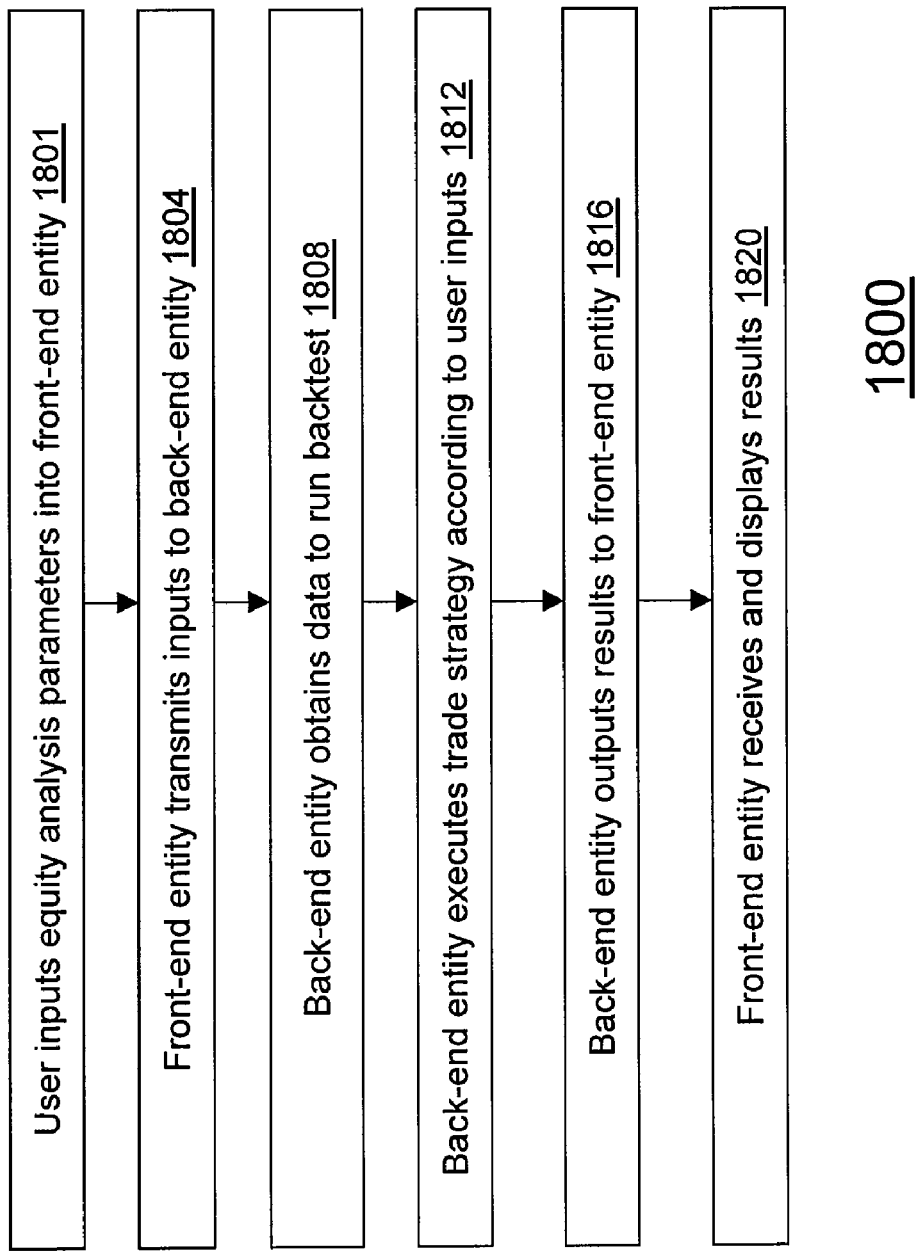
FIG. 18 illustrates an example of a process of backtesting on a back-end.

FIG. 18 shows an exemplary process 1800 of the backtesting of trade strategies on a back-end entity, where the backtesting is implemented as a Web service. FIG. 18 may be interpreted with reference to the components of FIG. 16, and it shows the process flow between the front-, back-, and central entities when trade strategies are being executed.

In the process 1800, the user inputs parameters related to equity analysis into the financial services application on a front-end entity 1601*a* (Step 1801). The parameters are related to testing a trade strategy. Although not shown, possible input parameters include raw profit/loss analysis based on a fixed currency amount; raw profit/loss analysis based on a fixed number of shares; profit/loss analysis based on a fixed currency amount wherein the starting capital is adjusted based on the profit/loss of a previous execution of the trade strategy; profit/loss analysis based on a fixed share per trade wherein the starting capital is adjusted based on the profit/loss of a previous execution of the trade strategy; supplied starting capital simulation mode using a fixed percent of existing equity available for the test; user definition of the number of shares or amount of currency used for each test.

The front-end entity 1601*a* transmits the parameters to the back-end entity 1605 (Step 1804). Input parameters to the back-end entity 1605 may be transmitted through known technologies such as hyper text transport protocol verbs of GET and POST inputs as described by the existing http 1.0/1.1 standards. Inputs can also be achieved through a known distributed transport via HTTP called simple object access protocol SOAP.

According to the user inputs, the back-end entity 1605 obtains from the central entity 1610 or local storage unit 1605*b* the data necessary to run the trade strategy simulation (Step 1808). The data may include historical data, streaming data, or both.

The back-end entity 1605 executes the trade strategy upon the data according to the user inputs (Step 1812). The back-end entity 1605 outputs the results of the executed trade strategy to the front-end entity 1600 (Step 1816). Although not shown, the output might comprise analytics such as long position simulated trades, short position simulated trades, or a combination of both. The output might comprise analytics comparing the trade strategy results to the hypothetical alternative of buying and holding the investments for the duration of the simulated back test. The output might comprise analytics for a trade strategy test such as hypothetical starting and ending capital, net profit, profit per granularity or bar increment, total commission charted by simulated brokerage firm, net profit percent, or annualized gain percent. Outputs may also include recent alert descriptions generated according to the most recent historical data used in backtesting a trade strategy. Outputs to the front-end entity may also comprise a simulated equity curve data. Outputs may also comprise raw historical pricing data or a graphical representation of any portion of the securities corresponding to the symbol set of the trade strategy. The front-end entity 1601 receives the outputs from the back-end entity 1605 and displays them (Step 1820).

In another embodiment of the system, multiple trade strategies may run simultaneously on the back-end entity 1605 and the results outputted to the front-end entity 1601, as needed.

In another embodiment of the system, the same code in the back-end entity 1605 that backtests trade strategies may be used or reused on the front-end entity 1601.

In another aspect of the client server system, inputs from the front-end entity 1601 and outputs from the back-end entity 1605 may be described using extensible markup language, such as XML.

[Extendable Objects]

Figure 19:
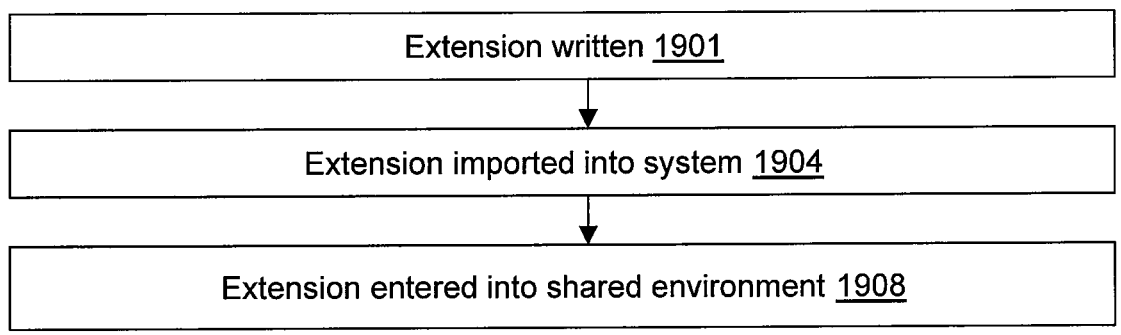
FIG. 19 illustrates an example of a process of use of extendable objects.

FIG. 19 shows a process flow related to the creation of extensions to further the financial services system's business functionality. An extension may be a relocatable piece of binary software code. An extension may be a .net class of software or part of the .net framework. The extension may relate to a charting, modeling, simulation, or execution component of the program. The extension may encompass a trade strategy, and it may be coupled to a security or group of securities. Either customers of the financial services program or members of the program's development team may create such extensions.

An extension writer uses a programming tool to write an extension (Step 1901). Some possible programming tools are Eclipse (IBM) and Visual Studio (Microsoft), but are not limited to these tools. The extension writer creates an extension adhering to a published specification, such as Application Programming Interface (API). By adhering to a published specification compatible with the financial services system's base software system, the extension writer may write extensions without detailed knowledge of the base software system or access to the base software system's code. By making certain features of the extension private, the extension writer may prevent third parties from accessing the extension's codeline.

The extension is imported into the financial services system (Step 1904). In one embodiment, the extension may be imported by using reflection to read the extensions from disk files. In another embodiment, the extension may be imported by being placed in one or more designated locations that the base software system checks for new extensions at runtime. In another embodiment, the extension may be imported by being placed in the home directory of the financial services application, wherein it is automatically integrated into the application.

The extension then enters an environment where it may be shared with other users (Step 1908). The exchange, receipt, and use of the extensions may be integrated into the program in a plug-and-play format. Users may share the extension via e-mail, downloads from a website, or other means determined by one skilled in the art.

Once a user retrieves an extension, he may execute the functions associated with the extension. The results of the extension are then displayed or executed through the same tools used to execute and display extensions the user wrote himself, or features already built into the financial services application.

In another aspect of extensions to the financial services web application, the extensions may also contain a viewable document with the rules of the strategy and accompanying documentation. In another aspect of extensions to the financial services web application, the extension may be a hot fix created by the program's development team. In yet another aspect of extensions to the financial services web application, the extension may be a patch created by the program's development team.

In another aspect of extensions to the financial services system, extensions created to be used with the desktop application may also be used by the financial services web application to enhance the functionality of the application.

The above-described systems and methods can be implemented in digital electronic circuitry, in computer hardware, firmware, and/or software. The implementation can be as a computer program product (i.e., a computer program tangibly embodied in an information carrier). Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD, and/or DVD disks. The implementation can, for example, be in an information carrier for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include and/or can be operatively coupled to receive data from and/or transfer data to one or more mass storage devices for storing data (e.g., magnetic, magneto-optical disks, or optical disks).

Data transmission and instructions can also occur over a communications network. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

A network can include, for example, a packet-based network and/or a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a television with a set top box, a computer, a computer with a browser device, a telephone, an EP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla®

Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for simulating a trade strategy using historical data, the computer-implemented method comprising:
   receiving, at a back-end server, a first set of one or more parameters from a first client device remote from the back-end server, the first set of one or more parameters defining a first trade strategy;
   obtaining, by the back-end server, first historical data from a first historical timeframe, wherein obtaining the first historical data comprises:
      determining whether the first historical data is in a local storage unit and is up-to-date,
      requesting and receiving the first historical data from a central storage unit if it is determined that the first historical data is not in the local storage unit or is not up-to-date,
      determining whether the received first historical data includes one or more first corrections associated with the first trade strategy,
      determining if the one or more first corrections reflect first corrected data associated with the first trade strategy, and
      storing the first corrected data in the local storage unit if it is determined that the one or more first corrections reflect first corrected data;
   simulating, by the back-end server, the first trade strategy over the first historical timeframe using the first historical data and the first set of one or more parameters, wherein simulating the first trade strategy further comprises re-simulating, by the back-end server, the first trade strategy using update historical data and the first set of one or more parameters; and
   transmitting, from the back-end server, results of the simulation and re-simulated simulation of the first trade strategy to the remote first client device.

2. The computer-implemented method of claim 1, wherein the first set of one or more parameters is defined using a Web service.

3. The computer-implemented method of claim 1, wherein the results of the simulations of the first and second trade strategies are transmitted in an extensible markup language (XML) format.

4. The computer-implemented method of claim 1, wherein the first set of one or more parameters comprise:
   a first parameter associated with raw profit/loss analysis based on a fixed currency amount,
   a second parameter associated with raw profit/loss analysis based on a fixed number of shares,
   a third parameter associated with profit/loss analysis based on a fixed currency amount wherein the starting capital is adjusted based on the profit/loss of a previous simulation of the first trade strategy,
   a fourth parameter associated with profit/loss analysis based on a fixed share per trade wherein the starting capital is adjusted based on the profit/loss of a previous simulation of the first trade strategy,
   a fifth parameter associated with supplied starting capital simulation mode using a fixed percent of existing equity available for the test,
   a sixth parameter associated with user definition of the number of shares or amount of currency used for each test, or
   any combination of the first, second, third, fourth, fifth and sixth parameters.

5. The computer-implemented method of claim 1, wherein the first and second trade strategies are associated with strategies for trading:
   one or more equities,
   one or more equity options,
   one or more futures,
   one or more futures options,
   one or more mutual funds,
   one or more derivative-based instruments, or
   any combination of equities, equity options, futures, futures options, mutual funds, or derivative-based instruments.

6. The computer-implemented method of claim 1, wherein the simulations of the first and second trade strategies are simulated simultaneously.

7. The computer-implemented method of claim 1, wherein obtaining, by the back-end server, the first historical data comprises requesting the first historical data from one or more remote databases.

8. The computer-implemented method of claim 7, wherein the one or more remote databases comprise:
   one or more economic databases,
   one or more fundamental databases,
   one or more technical indicator databases, or
   any combination of economic databases, fundamental databases, or technical indicator databases.

9. The computer-implemented method of claim 1 further comprising storing the obtained first and second historical data in a local storage unit.

10. The computer-implemented method of claim 9 further comprising:
    determining if the local storage unit has updated data;
    if the local storage unit does not have updated data, then updating at least a part of the historical data stored in the local storage unit.

11. The computer-implemented method of claim 10, wherein updating the part of the historical data is performed when an interval of time for the first or second trade strategies has elapsed.

12. The computer-implemented method of claim 11, wherein the interval of time comprises a year, a quarter, a month, a week, a day, 6 hours, 3 hours, 1 hour, 30 minutes, 15 minutes, 10 minutes, 5 minutes, 3 minutes, or 1 minute.

13. The computer-implemented method of claim 10 further comprising:
    re-simulating, by the back-end server, the first trade strategy using the updated historical data and the first set of one or more parameters; and
    transmitting, from the back-end server, results of the re-simulated simulation of the first trade strategy to the remote first client device.

14. The computer-implemented method of claim 1 further comprising:
 receiving, at the back-end server, a second set of one or more parameters from a second client device remote from the back-end server, the second set of one or more parameters defining a second trade strategy, the second client device being different from the first client device;
 obtaining, by the back-end server, second historical data associated with a second historical timeframe, wherein obtaining the second historical data comprises:
  determining whether the second historical data is in the local storage unit and is up-to-date,
  requesting and receiving the second historical data from the central storage unit if it is determined that the second historical data is not in the local storage unit or is not up-to-date,
  determining whether the received second historical data includes one or more second corrections associated with the second trade strategy,
  determining if the one or more second corrections reflect second corrected data associated with the second trade strategy, and
  storing the second corrected data in the local storage unit if it is determined that the one or more second corrections reflect second corrected data;
 simulating, by the back-end server, the second trade strategy over the second historical timeframe using the second historical data and the second set of one or more parameters, wherein simulating the second trade strategy further comprises re-simulating, by the back-end server, the second trade strategy using updated historical data and the second set of one or more parameters; and
 transmitting, from the back-end server, results of the simulation and re-simulated simulation of the second trade strategy to the remote second client device.

15. The method of claim 1, wherein obtaining the first historical data further comprises:
 determining whether an interval of time has elapsed for a request for updated data associated with a symbol in the first trade strategy;
 marking the symbol if a total number of intervals of time that have elapsed satisfies a predetermined threshold condition; and
 transmitting, from the back-end server, options for management of the symbol to the remote first client device.

16. The method of claim 15, wherein the options for management of the symbol comprise a delete option, a replacement option, a restore option, and an ignore option.

17. A computer program product, tangibly embodied in an information carrier, the computer program product including instructions being operable to cause a data processing apparatus to:
 obtain first historical data associated with a second historical timeframe and associated with a first trade strategy defined by a first set of one or more parameters received from a first client device remote from the data processing apparatus, wherein the instructions being operable to cause the data processing apparatus to obtain the first historical data comprises instructions being operable to cause the data processing apparatus to:
  determine whether the first historical data is in a local storage unit and is up-to-date,
  request and receiving the first historical data from a central storage unit if it is determined that the first historical data is not in the local storage unit or is not up-to-date,
  determine whether the received first historical data includes one or more first corrections associated with the first trade strategy,
  determine if the one or more first corrections reflect first corrected data associated with the first trade strategy, and
  store the first corrected data in the local storage unit if it is determined that the one or more first corrections reflect first corrected data;
 simulate the first trade strategy over the first historical timeframe using the first historical data and the first set of one or more parameters, wherein the instructions being operable to cause the data processing apparatus to simulate the first trade strategy comprises instructions being operable to cause the data processing apparatus to re-simulate the first trade strategy using updated historical data and the first set of one or more parameters; and
 transmit results of the simulation and re-simulated simulation of the first trade strategy to the remote first client device.

18. A system for simulating a trade strategy using historical data, the system comprising:
 a back-end server configured to:
  receive a first set of one or more parameters from a first client device remote from the back-end server, the first set of one or more parameters defining a first trade strategy;
  obtain first historical data associated with a first historical timeframe and associated with the first trade strategy, wherein to obtain the first historical data the back-end server is further configured to:
   determine whether the first historical data is in a local storage unit and is up-to-date,
   request and receiving the first historical data from a central storage unit if it is determined that the first historical data is not in the local storage unit or is not up-to-date,
   determine whether the received first historical data includes one or more first corrections associated with the first trade strategy,
   determine if the one or more first corrections reflect first corrected data associated with the first trade strategy, and
   store the first corrected data in the local storage unit if it is determined that the one or more first corrections reflect first corrected data;
  simulate the first trade strategy over the first historical timeframe using the first historical data and the first set of one or more parameters, wherein to simulate the first trade strategy the back-end server is further configured to re-simulate the first trade strategy using updated historical data and the first set of one or more parameters; and
  transmit results of the simulation and re-simulated simulation of the first trade strategy to the remote first client device.

* * * * *